US012536520B2

(12) United States Patent
Jones et al.

(10) Patent No.: US 12,536,520 B2
(45) Date of Patent: Jan. 27, 2026

(54) REAL-TIME PROVISIONING OF TARGETED DIGITAL CONTENT ASSOCIATED WITH AN INITIATED DATA EXCHANGE BASED ON STRUCTURED MESSAGING DATA

(71) Applicant: The Toronto-Dominion Bank, Toronto (CA)

(72) Inventors: Christopher Mark Jones, Villanova, PA (US); Barry Wayne Baird, Jr., Kennett Square, PA (US); Claude Bernell Lawrence, Jr., Philadelphia, PA (US); Jonathan Joseph Prendergast, West Chester, PA (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/884,796

(22) Filed: Aug. 10, 2022

(65) Prior Publication Data

US 2023/0056764 A1 Feb. 23, 2023

Related U.S. Application Data

(60) Provisional application No. 63/234,112, filed on Aug. 17, 2021.

(51) Int. Cl.
*G06Q 20/26* (2012.01)
*G06Q 40/03* (2023.01)

(52) U.S. Cl.
CPC .................................... *G06Q 20/26* (2013.01)

(58) Field of Classification Search
CPC ............................... G06Q 20/26; G06Q 40/03
(Continued)

(56) References Cited

U.S. PATENT DOCUMENTS 6,029,150 A 2/2000 Kravitz
7,184,989 B2 2/2007 Hansen et al.
(Continued)

FOREIGN PATENT DOCUMENTS

AU 2013206122 7/2014
CA 3014693 2/2020
(Continued)

OTHER PUBLICATIONS

"POS Financing: There's a Lending Marketplace for That," PYMNTS.com, Feb. 19. 2020 (19 pages).
(Continued)

*Primary Examiner* — Clifford B Madamba
(74) *Attorney, Agent, or Firm* — Nixon Peabody LLP

(57) ABSTRACT

The disclosed embodiments include computer-implemented systems and processes that provision, in real-time, targeted digital content associated with an initiated data exchange based on structured messaging data. For example, an apparatus may receive a message associated with a real-time payment requested from a first counterparty by a second counterparty. The message may include elements of message data disposed within corresponding message fields, and based on at least the elements of message data, the apparatus may generate product data characterizing a product available to the first counterparty and transmit first notification data including digital content associated with the available product and with the data exchange to a first device operable by the first counterparty. Based on response data generated by the first device, the apparatus may perform operations that provision the available product to the first counterparty in accordance with the product data.

20 Claims, 11 Drawing Sheets

(58) Field of Classification Search
USPC ........................................................ 705/37
See application file for complete search history.

(56) References Cited

U.S. PATENT DOCUMENTS

| | | | |
|---|---|---|---|
| 7,366,694 | B2 | 4/2008 | Lazerson |
| 7,487,112 | B2 | 2/2009 | Barnes, Jr. |
| 7,555,459 | B2 | 6/2009 | Dhar et al. |
| 7,593,889 | B2 | 9/2009 | Raines et al. |
| 7,624,070 | B2 | 11/2009 | Lebouitz |
| 7,630,933 | B2 | 12/2009 | Peterson et al. |
| 7,653,592 | B1 | 1/2010 | Flaxman et al. |
| 7,676,425 | B1 | 3/2010 | Noles |
| 7,676,431 | B2 | 3/2010 | O'Leary et al. |
| 7,680,737 | B2 | 3/2010 | Smith, Jr. et al. |
| 7,693,790 | B2 | 4/2010 | Lawlor et al. |
| 7,707,055 | B2 | 4/2010 | Behmoiras et al. |
| 7,707,107 | B2 | 4/2010 | Gebb et al. |
| 7,801,778 | B2 | 9/2010 | Fox |
| 7,809,633 | B2 | 10/2010 | Nolan et al. |
| 7,813,965 | B1 | 10/2010 | Robinson et al. |
| 7,827,052 | B2 | 11/2010 | Scott et al. |
| 7,844,546 | B2 | 11/2010 | Fleishman et al. |
| 7,849,003 | B2 | 12/2010 | Egnatios et al. |
| 7,873,543 | B2 | 1/2011 | Ferrier et al. |
| 7,899,712 | B2 | 3/2011 | May et al. |
| 7,904,306 | B2 | 3/2011 | Johnson et al. |
| 7,912,784 | B2 | 3/2011 | Sobek |
| 7,970,669 | B1 | 6/2011 | Santos |
| 8,156,022 | B2 | 4/2012 | Fell et al. |
| 8,249,983 | B2 | 8/2012 | Dilip et al. |
| 8,423,403 | B2 | 4/2013 | McClung |
| 8,433,648 | B2 | 4/2013 | Keithley et al. |
| 8,600,798 | B1 | 12/2013 | Corr et al. |
| 8,606,705 | B2 | 12/2013 | Zanzot et al. |
| 8,612,339 | B2 | 12/2013 | Rose et al. |
| 8,615,426 | B2 | 12/2013 | Carlson |
| 8,639,910 | B2 | 1/2014 | Karamcheti et al. |
| 8,666,812 | B1 | 3/2014 | Gandhi |
| 8,700,484 | B2 | 4/2014 | Senior |
| 8,712,912 | B2 | 4/2014 | Carlson et al. |
| 8,719,071 | B2 | 5/2014 | MacIntyre et al. |
| 8,732,044 | B2 | 5/2014 | Lovelett et al. |
| 8,744,899 | B2 | 6/2014 | Rose et al. |
| 8,751,387 | B2 | 6/2014 | Hougland et al. |
| 8,756,099 | B2 * | 6/2014 | Keithley ................ G06Q 30/06 705/14.1 |
| 8,788,416 | B1 | 7/2014 | Vu |
| 8,799,150 | B2 | 8/2014 | Annappindi |
| 8,814,039 | B2 | 8/2014 | Bishop et al. |
| 9,094,512 | B2 | 7/2015 | Sheldon et al. |
| 9,218,618 | B2 | 12/2015 | Walker et al. |
| 9,390,410 | B2 | 7/2016 | Casares |
| 9,412,118 | B2 | 8/2016 | Loomis |
| 9,563,915 | B2 | 2/2017 | Brady et al. |
| 9,600,839 | B2 | 3/2017 | Calman et al. |
| 9,792,600 | B1 | 10/2017 | Grassadonia |
| 9,799,026 | B1 | 10/2017 | Allen et al. |
| 9,875,385 | B1 | 1/2018 | Humphreys et al. |
| 9,922,324 | B2 | 3/2018 | Wilson et al. |
| 9,996,616 | B2 | 6/2018 | Grant et al. |
| 10,108,959 | B2 | 10/2018 | Wolfs et al. |
| 10,185,936 | B2 | 1/2019 | Praisner et al. |
| 10,282,715 | B2 | 5/2019 | Brennan et al. |
| 10,290,016 | B1 | 5/2019 | Rose |
| 10,332,160 | B2 * | 6/2019 | Dean .................. G06F 16/9535 |
| 10,354,267 | B2 | 7/2019 | Carlson et al. |
| 10,387,881 | B2 | 8/2019 | Studnitzer |
| 10,453,062 | B2 | 10/2019 | Wolfs et al. |
| 10,529,016 | B2 | 1/2020 | Abela et al. |
| 10,535,054 | B1 | 1/2020 | Spitzer |
| 10,552,807 | B2 | 2/2020 | Marcous et al. |
| 10,558,962 | B2 | 2/2020 | Szeto |
| 10,565,630 | B2 | 2/2020 | Haceaturean et al. |
| 10,586,236 | B2 | 3/2020 | Pourfallah et al. |
| 10,607,284 | B2 | 3/2020 | Loganathan et al. |
| 10,643,277 | B2 | 5/2020 | Berta et al. |
| 10,679,285 | B1 | 6/2020 | Kurani et al. |
| 10,699,289 | B1 | 6/2020 | Dalton et al. |
| 10,733,623 | B2 | 8/2020 | Ovick et al. |
| 10,740,843 | B2 | 8/2020 | Shakkarwar |
| 10,743,149 | B2 | 8/2020 | Sewell |
| 10,771,413 | B1 | 9/2020 | Heffron |
| 10,776,751 | B2 | 9/2020 | Chin |
| 10,783,510 | B2 | 9/2020 | George et al. |
| 10,789,580 | B2 | 9/2020 | Wolfs et al. |
| 10,789,641 | B2 | 9/2020 | Lesandro et al. |
| 10,909,508 | B2 | 2/2021 | Fineman et al. |
| 11,468,443 | B2 | 10/2022 | Jones et al. |
| 11,727,430 | B2 * | 8/2023 | Mitchell ................ G06Q 20/26 705/14.3 |
| 2002/0111915 | A1 | 8/2002 | Clemens et al. |
| 2004/0138999 | A1 | 7/2004 | Friedman et al. |
| 2004/0220873 | A1 | 11/2004 | Nolan, III et al. |
| 2005/0004868 | A1 | 1/2005 | Klatt et al. |
| 2006/0143124 | A1 | 6/2006 | Ehrke |
| 2007/0198407 | A1 | 8/2007 | Winter |
| 2007/0265946 | A1 | 11/2007 | Schimpf et al. |
| 2007/0288312 | A1 | 12/2007 | Wang |
| 2008/0270246 | A1 | 10/2008 | Chen |
| 2009/0132410 | A1 | 5/2009 | Penney et al. |
| 2009/0164627 | A1 | 6/2009 | Bishop et al. |
| 2009/0271224 | A1 | 10/2009 | Lange |
| 2010/0057606 | A1 | 3/2010 | Louie |
| 2010/0057610 | A1 | 3/2010 | Pinkerton |
| 2010/0211499 | A1 | 8/2010 | Zanzot et al. |
| 2010/0250407 | A1 | 9/2010 | Silva |
| 2011/0099067 | A1 | 4/2011 | Cooper et al. |
| 2011/0191173 | A1 | 8/2011 | Blackhurst |
| 2012/0036013 | A1 | 2/2012 | Neuhaus |
| 2012/0284130 | A1 | 11/2012 | Lewis et al. |
| 2013/0066800 | A1 | 3/2013 | Falcone et al. |
| 2013/0073386 | A1 | 3/2013 | Rose et al. |
| 2013/0073445 | A1 | 3/2013 | Meszaros |
| 2013/0138563 | A1 | 5/2013 | Gilder et al. |
| 2013/0226789 | A1 | 8/2013 | Orttung et al. |
| 2013/0246220 | A1 | 9/2013 | Hammad et al. |
| 2014/0025467 | A1 | 1/2014 | Nagarahan et al. |
| 2014/0067677 | A1 | 3/2014 | Ali et al. |
| 2014/0074688 | A1 | 3/2014 | Shvarts |
| 2014/0095638 | A1 | 4/2014 | Chen |
| 2014/0172687 | A1 | 6/2014 | Chirehdast |
| 2014/0236695 | A1 | 8/2014 | Shvarts et al. |
| 2014/0279444 | A1 | 9/2014 | Kassemi et al. |
| 2014/0279513 | A1 | 9/2014 | Dodds-Brown et al. |
| 2014/0310151 | A1 | 10/2014 | Shishkov et al. |
| 2015/0032525 | A1 | 1/2015 | Blackhurst et al. |
| 2015/0032538 | A1 | 1/2015 | Calman et al. |
| 2015/0073902 | A1 | 3/2015 | Soujanya |
| 2015/0100416 | A1 | 4/2015 | Blackhurst et al. |
| 2015/0100481 | A1 | 4/2015 | Ghosh et al. |
| 2015/0112854 | A1 | 4/2015 | Guriel et al. |
| 2015/0170175 | A1 | 6/2015 | Zhang et al. |
| 2015/0193873 | A1 | 7/2015 | Hammock et al. |
| 2015/0228031 | A1 | 8/2015 | Emison et al. |
| 2015/0310490 | A1 | 10/2015 | Meredith et al. |
| 2015/0363762 | A1 | 12/2015 | Kimberg |
| 2016/0034969 | A1 | 2/2016 | Mazurov |
| 2016/0104155 | A1 | 4/2016 | Mcgaugh et al. |
| 2016/0189292 | A1 | 6/2016 | Deshpande et al. |
| 2016/0196566 | A1 | 7/2016 | Murali et al. |
| 2016/0247177 | A1 | 8/2016 | Zamer |
| 2017/0004501 | A1 | 1/2017 | Ledford et al. |
| 2017/0161826 | A1 | 6/2017 | Packer et al. |
| 2017/0169511 | A1 | 6/2017 | Kelly |
| 2017/0193501 | A1 | 7/2017 | Cole et al. |
| 2017/0221066 | A1 | 8/2017 | Ledford et al. |
| 2017/0270493 | A1 | 9/2017 | Lugli et al. |
| 2017/0364878 | A1 | 12/2017 | Malhotra et al. |
| 2018/0018661 | A1 | 1/2018 | Wade |
| 2018/0096335 | A1 | 4/2018 | Moghaizel et al. |
| 2018/0097901 | A1 | 4/2018 | Ramachanda |
| 2018/0174116 | A1 | 6/2018 | Maenpaa |
| 2018/0181928 | A1 | 6/2018 | Woo |

(56) References Cited

U.S. PATENT DOCUMENTS

| | | | |
|---|---|---|---|
| 2018/0330354 | A1 | 11/2018 | Xiu et al. |
| 2019/0012645 | A1 | 1/2019 | Subramaniam et al. |
| 2019/0043052 | A1 | 2/2019 | Ledford et al. |
| 2019/0109915 | A1 | 4/2019 | McPhee et al. |
| 2019/0114598 | A1 | 4/2019 | Subramaniam et al. |
| 2019/0114666 | A1 | 4/2019 | Kohli |
| 2019/0340590 | A1 | 11/2019 | Ledford et al. |
| 2019/0378182 | A1 | 12/2019 | Weinflash et al. |
| 2020/0014642 | A1 | 1/2020 | Sidi et al. |
| 2020/0034813 | A1 | 1/2020 | Calinog et al. |
| 2020/0051117 | A1 | 2/2020 | Mitchell |
| 2020/0074565 | A1 | 3/2020 | Dotter |
| 2020/0104911 | A1 | 4/2020 | Suvajac et al. |
| 2020/0160295 | A1 | 5/2020 | Jagalpure et al. |
| 2020/0242600 | A1 | 7/2020 | Stack et al. |
| 2020/0327529 | A1 | 10/2020 | Mukherjee et al. |
| 2020/0349610 | A1* | 11/2020 | Publicover ............ H04L 67/306 |
| 2020/0349639 | A1 | 11/2020 | Mousseau |
| 2020/0364760 | A1 | 11/2020 | Sabat et al. |
| 2020/0364784 | A1 | 11/2020 | Dill |
| 2020/0387878 | A1 | 12/2020 | Jones et al. |
| 2021/0150624 | A1 | 5/2021 | Tucker et al. |
| 2022/0044238 | A1 | 2/2022 | Jones et al. |
| 2022/0076248 | A1 | 3/2022 | Kapoor et al. |
| 2022/0198411 | A1 | 6/2022 | Jones et al. |
| 2022/0198417 | A1 | 6/2022 | Jones et al. |
| 2022/0198427 | A1 | 6/2022 | Jones et al. |
| 2022/0198432 | A1 | 6/2022 | Jones et al. |
| 2022/0198433 | A1 | 6/2022 | Jones et al. |
| 2022/0198445 | A1 | 6/2022 | Jones et al. |
| 2022/0198501 | A1 | 6/2022 | Jones et al. |
| 2022/0198543 | A1 | 6/2022 | Jones et al. |
| 2022/0383301 | A1 | 12/2022 | Jones et al. |
| 2022/0383313 | A1 | 12/2022 | Jones et al. |
| 2022/0383314 | A1 | 12/2022 | Jones et al. |
| 2022/0414656 | A1 | 12/2022 | Jones et al. |
| 2023/0055605 | A1 | 2/2023 | Jones et al. |
| 2023/0056173 | A1 | 2/2023 | Jones et al. |

FOREIGN PATENT DOCUMENTS

| | | | |
|---|---|---|---|
| CN | 104321738 | | 6/2018 |
| IN | 202011016562 | | 6/2020 |
| KR | 20060003230 | | 1/2006 |
| KR | 20170127418 | | 11/2014 |
| KR | 2016014969 | | 12/2016 |
| KR | 10-2073974 | | 2/2020 |
| WO | WO 2001050370 | | 7/2001 |
| WO | WO 2002069290 | | 9/2002 |
| WO | WO 2003025712 | | 3/2003 |
| WO | 2012151571 | A3 | 11/2012 |
| WO | WO 2013044286 | | 4/2013 |
| WO | WO 2016190810 | | 1/2016 |
| WO | WO 2019071263 | | 4/2019 |

OTHER PUBLICATIONS

"Target is Live with Afterpay!," Afterpay.com, Apr. 25, 2021 (4 pages).

"Klama's Marketing Strategy: The Unique Growth Story Behind the Brand," nogood.io, Feb. 23, 2021 (14 pages).

STIC Search Report, Oct. 12, 2023 (4 pages).

STIC Search Report, May 5, 2023 (4 pages).

Quibria, "Introduction to ISO 20022 For U.S. Financial Institutions", NACHA—3 The Electronic Payments Association; 45 pgs. (2015).

Wandhofer et al., "The Future of Correspondent Banking Cross Border Payments", Swift Institute Working Paper No. Jan. 2017; 63 pgs. (2018).

Rogers, The Definitive Guide to eCommerce Product Reviews (2017).

Khanna, "Venmo'ed: Sharing Your Payment Data with the World," Technology Science, 2018102901, Oct. 28, 2015 (27 pages).

STIC Search Report, Sep. 17, 2023 (4 pages).

Lochy, "Big Data in the Financial Services Industry—From data to insights", Finextra, 12 pgs. (2019).

Cohen, et al., "Ride on! Mobility business models for the sharing economy," Organization & Environment, 27.3, 2014, pp. 279-296.

Fis, Flavors of Fast, Report; 59 pages (2019).

Infosys, "Global Trends in the Cards and Payments Industry", 40 pgs. (2020).

Sullivan, "Sick of Overdraft Fees? There's an App for that." 8 pgs. (2018).

* cited by examiner

238

| | | |
|---|---|---|
| Requested Execution Date | 2022-09-01 | 240 |
| | | |
| Debtor | | 244 |
| Name | John Q. Stone | |
| Postal Address | | |
| Street Name | Eye Street NW | |
| Bulding Number | 2220 | |
| Postal Code | 20037 | |
| Town Name | Washington, D.C. | |
| Country | US | |
| | | |
| Debtor Account | | |
| Identification | XXXX-1234-5678-9012 | 246 |
| | | |
| Amount | | 242 |
| Instructed Amount | 5,500.00 | |
| Currency | USD | |
| | | |
| Creditor | | 248 |
| Name | Lex's Home Improvement | |
| Postal Address | | |
| Street Name | Arlington Boulevard | |
| Bulding Number | 6201 | |
| Postal Code | 22044 | |
| Town Name | Falls Church | |
| Country | US | |
| | | |
| Creditor Account | | |
| Identification | XXXX-9012-3456-7890 | 250 |
| | | |
| Remittance Information | | |
| Unstructured | http://www.example.com/receipt?custid='1234'?zip=22044' | 256 |

FIG. 2B

REAL-TIME PROVISIONING OF TARGETED DIGITAL CONTENT ASSOCIATED WITH AN INITIATED DATA EXCHANGE BASED ON STRUCTURED MESSAGING DATA

CROSS-REFERENCE TO RELATED APPLICATION

This application claims the benefit of priority to U.S. Provisional Patent Application No. 63/234,112, filed on Aug. 17, 2021, the entire disclosure of which is expressly incorporated herein by reference to its entirety.

TECHNICAL FIELD

The disclosed embodiments generally relate to computer-implemented systems and processes that provision, in real-time, targeted digital content associated with an initiated data exchange based on structured messaging data.

BACKGROUND

Today, the mass adoption of smart phones and digital payments within the global marketplace drives an increasingly rapid adoption of real-time payment (RTP) technologies by financial institutions, consumers, vendors and merchants, and other participants in the payment ecosystem. Many RTP technologies emphasize data, messaging, and global interoperability and in contrast to many payment rails, such as those that support credit card payments, embrace the near ubiquity of mobile technologies in daily life to provide, to the participants in the RTP ecosystem, real-time services and access to funds.

SUMMARY

In some examples, an apparatus includes a communications interface, a memory storing instructions, and at least one processor coupled to the communications interface and to the memory. The at least one processor is configured to execute the instructions to receive, via the communications interface, a message associated with a first real-time payment requested from a first counterparty by a second counterparty. The message includes elements of message data disposed within corresponding message fields, and the elements of message data characterize an exchange of data initiated between the first and second counterparties. Additionally, the at least one processor is further configured to execute the instructions to, based on at least the elements of message data, generate product data characterizing a product available to the first counterparty and to transmit, via the communications interface, first notification data to a first device operable by the first counterparty. The first notification data includes digital content associated with the available product and with the data exchange, and the first device is configured to present at least a portion of the digital content within a digital interface. Further, the at least one processor may be configured to execute the instructions to, based on response data generated by the first device, perform operations that provision the available product to the first counterparty in accordance with the product data.

In other examples, a computer-implemented method includes receiving, using at least one processor, a message associated with a first real-time payment requested from a first counterparty by a second counterparty. The message includes elements of message data disposed within corresponding message fields, and the elements of message data characterize an exchange of data initiated between the first and second counterparties. Additionally, the computer-implemented method includes, based on at least the elements of message data, generating, using the at least one processor, product data characterizing a product available to the first counterparty, and transmitting, using the at least one processor, first notification data to a first device operable by the first counterparty. The first notification data includes digital content associated with the available product and with the data exchange, and the first device is configured to present at least a portion of the digital content within a digital interface. Further, the computer-implemented method includes, based on response data generated by the first device, performing operations, using the at least one processor, that provision the available product to the first counterparty in accordance with the product data.

Additionally, in some examples, a tangible, non-transitory computer-readable medium stores instructions that, when executed by at least one processor, cause the at least one processor to perform a method. The method includes receiving a message associated with a first real-time payment requested from a first counterparty by a second counterparty. The message includes elements of message data disposed within corresponding message fields, and the elements of message data characterize an exchange of data initiated between the first and second counterparties. Additionally, the method includes, based on at least the elements of message data, generating product data characterizing a product available to the first counterparty, and transmitting first notification data to a first device operable by the first counterparty. The first notification data includes digital content associated with the available product and with the data exchange, and the first device is configured to present at least a portion of the digital content within a digital interface. The method also includes, based on response data generated by the first device, performing operations that provision the available product to the first counterparty in accordance with the product data.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIG. 2B illustrates portions of an exemplary request for payment (RFP), in accordance with some exemplary embodiments.

Like reference numbers and designations in the various drawings indicate like elements.

DETAILED DESCRIPTION

Figure 1:
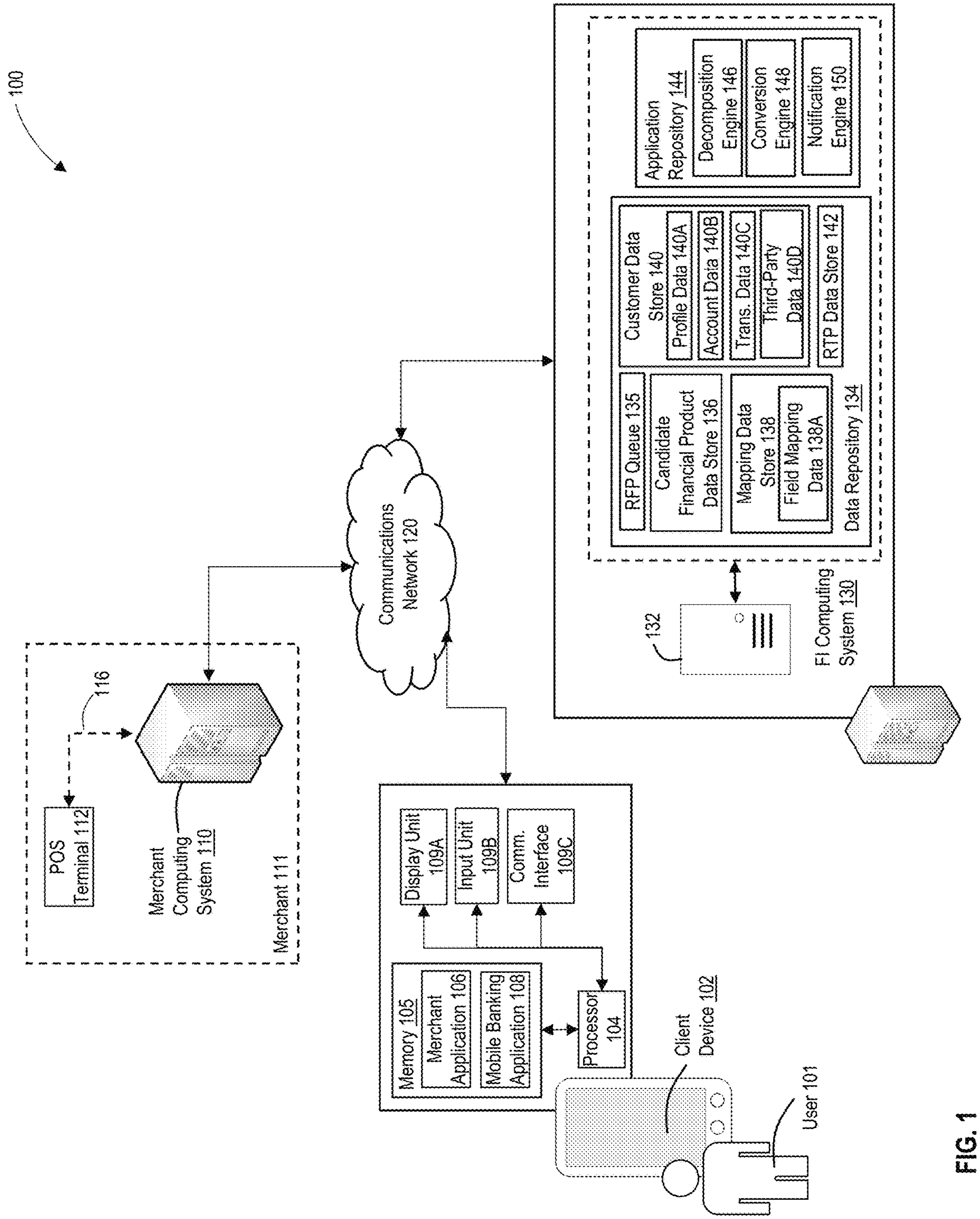
FIG. 1 is a block diagram of an exemplary computing environment, in accordance with some exemplary embodiments.

Today, the mass adoption of smart phones and digital payments within the global marketplace drives an adoption of real-time payment (RTP) technologies by financial institutions, consumers, vendors and merchants, and other participants in the payment ecosystem. These RTP technologies often emphasize data, messaging, and global interoperability and in contrast to conventional payment rails, may embrace the near ubiquity of mobile technologies in daily life to provide, to the participants in the RTP ecosystem, real-time service and access to funds. To facilitate the strong emphasis on data, messaging, and global interoperability between financial institutions, many RTP technologies adopt, and exchange data formatted in accordance with, one or more standardized data-exchange protocols, such as the ISO 20022 standard for electronic data exchange between financial institutions.

For example, a customer of a financial institution may initiate a transaction to purchase one or more products or services from a merchant, either through in-person interaction at a physical location of the merchant, or through digital interactions with a computing system of the merchant (e.g., via a web page or other digital portal). In some instances, and to fund the initiated purchase transaction, the customer may, via a point-of-sale (POS) terminal device coupled communicatively to the merchant computing system, provide the merchant with data characterizing a payment instrument, such as credit card account issued by the financial institution (e.g., via input provisioned to the web page or digital portal, or based on an interrogation of a physical payment card by point-of-sale terminal, etc.). The merchant computing system may perform operations that generate elements of messaging data identifying and characterizing the merchant and the initiated purchase transaction, and including portions of the data characterizing the payment instrument, and that submit the generated elements of messaging data to a transaction processing network or payment rail in accordance with a predetermined schedule, e.g., in batch form with other elements of messaging data at a predetermined time on a daily basis. In some instances, one or more computing systems of the transaction processing network or payment rail may perform operations that execute, clear, and settle the initiated purchase transaction involving the payment instrument within a predetermined temporal interval subsequent to the initiation of the purchase transaction, such as, but not limited to, forty-eight hours.

In other examples, the merchant and the financial institution of the customer may represent participants in the RTP ecosystem, and the merchant computing system (or a computing system associated with a financial institution of the merchant) may generate a message, e.g., a Request for Payment (RFP) message, that requests a real-time payment from the customer to fund the initiated purchase transaction, and may transmit the RFP message to one or more computing systems of the financial institution of the customer, e.g., directly or through one or more intermediate systems associated with the RTP ecosystem, such as a clearinghouse system. For example, the merchant computing system may perform operations that generate, or that trigger a generation of, the RFP message based on input provisioned to the POS terminal device by the customer, e.g., based on a scanned matrix barcode or QR code encoding elements of data characterizing the customer or a payment instrument selected by the customer to fund the initiated purchase transaction.

The generated and transmitted RFP message may, for example, be formatted in accordance with the ISO 20022 data-exchange format, and may include message fields populated with information that includes, but is not limited to, information identifying the customer and the merchant, information characterizing the requested payment (e.g., a requested payment amount, a requested payment date, an identifier of an payment instrument selected by the customer to fund the requested, real-time payment, or an identifier of an account of the merchant capable of receiving the requested, real-time payment, etc.) and information characterizing the initiated purchase transaction (e.g., a transaction date or time, or an identifier of one or more of the products or services involved in the initiated purchase transaction, such as a corresponding UPC, etc.). Further, the ISO-20022-compliant RFP message may also include a link within a structured or unstructured message field to information, such as remittance data, associated with the requested, real-time payment (e.g., a long- or shortened Uniform Resource Location (URL) pointing to a formatted invoice or statement that includes any of the information described herein).

In some examples, the elements of structured or unstructured data maintained within the message fields of exemplary, ISO-20022-compliant RFP messages described herein may extend beyond the often-limited content of the message data transmitted across many existing payment rails and transaction processing networks. Further, when intercepted and decomposed by a computing system of the financial institution of the customer (e.g., an FI computing system), these elements of structured or unstructured RFP message data may be processed by the FI computing system to determine adaptively terms and conditions of a financial product that is available for issuance to the customer by the financial institution, and that is appropriate to fund the real-time payment requested from the customer by the merchant and to provision, to a device of the customer in real-time and contemporaneously with the receipt of the RFP message, elements of digital content that prompt the customer to accept, or alternatively, decline an offer to fund the requested, real-time payment using the available financial product in accordance with the terms and conditions. By way of example, and using any of the exemplary processes described herein, the FI computing system may provision, to the customer device, a product notification that identifies and characterizes the available financial product, such as an installment loan, and the terms and conditions associated with that available financial product, and an application program executed by the customer device may perform operations, described herein, that render the product notification for presentation with a portion of a digital interface.

Upon presentation within the digital interface of the customer device, the product notification may, among other things, identify the available financial product and the determined terms and conditions, and may prompt the customer to accept, or alternatively decline, the offer to fund the real-time payment requested by the merchant using the available financial product in accordance with the determine terms and conditions. For example, the presented product notification may prompt the customer to accept, or alternatively decline, the offer to fund the real-time payment requested by the merchant using the available financial product by approving, or alternatively, declining, a nominal, real-time payment requested from the customer by the financial institution, e.g., a nominal, real-time payment of $1.00 funded by a customer-selected payment instrument.

Further, and based on confirmation data indicative of the customer acceptance of the offered financial product, the FI computing system may perform any of the exemplary processes described herein to issue the now-accepted financial product to the customer, and to generate an additional, ISO-2002-compliant RTP message that, when provisioned to the merchant computing system (or to the intermediate computing system, such as the computing system of the merchant's financial institution), provides the requested payment using funds drawn from the issued financial product in real-time and contemporaneously with the initiation of the purchase transaction and the requested for the payment by the merchant. In some instances, described herein, the merchant computing system may provision data confirming the issuance of the financial product, to the customer by the financial institution, and the funding of the real-time payment requested by the merchant using the now-issued financial product, to the POS terminal device, which may present a graphical representation of the provisioned data within a corresponding digital interface contemporaneously with the initiation of the purchase transaction, e.g., while the customer remains disposed proximate to the POS terminal device.

Certain of the exemplary processes described herein, which decompose the structured message fields of an ISO-20022-compliant RFP message to obtain elements of decomposed message data characterizing the customer, the merchant, the initiated purchase transaction, and the requested, real-time payment, which analyze the elements of decomposed message data to determine terms and conditions of a financial product appropriate to, and available to fund, the requested, real-time payment, and which provision data characterizing the offer to fund, the requested, real-time payment using the available financial product to the customer device for presentation within a digital interface in real-time and contemporaneously with the initiated purchase transaction, may be implemented in addition to, or as an alternate to, many processes that relay on the often-limited content of temporally delayed message data transmitted across many existing payment rails and transaction processing networks.

A. Exemplary Computing Environments

FIG. 1 is a diagram illustrating an exemplary computing environment 100 that includes, among other things, one or more computing devices, such as a client device 102, and one or more computing systems, such as a merchant computing system 110 and a financial institution (FI) system 130, each of which may be operatively connected to, and interconnected across, one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Client device 102 may include a computing device having one or more tangible, non-transitory memories, such as memory 105, that store data and/or software instructions, and one or more processors, e.g., processor 104, configured to execute the software instructions. The one or more tangible, non-transitory memories may, in some aspects, store application programs, application engines or modules, and other elements of code executable by the one or more processors, such as, but not limited to, an executable web browser (e.g., Google Chrome™, Apple Safari™, etc.), an executable application associated with merchant computing system 110 (e.g., merchant application 106), and additionally or alternatively, an executable application associated with FI computing system 130 (e.g., mobile banking application 108). Further, although not illustrated in FIG. 1, memory 105 may also include one or more structured or unstructured data repositories or databases, and client device 102 may maintain one or more elements of device data within the one or more structured or unstructured data repositories or databases. For example, the elements of device data may uniquely identify client device 102 within computing environment 100, and may include, but are not limited to, an Internet Protocol (IP) address assigned to client device 102 or a media access control (MAC) layer assigned to client device 102.

Client device 102 may include a display unit 109A configured to present interface elements to a corresponding user, such as a user 101, and an input unit 109B configured to receive input from user 101, e.g., in response to the interface elements presented through display unit 109A. By way of example, display unit 109A may include, but is not limited to, an LCD display unit or other appropriate type of display unit, and input unit 109B may include, but is not limited to, a keypad, keyboard, touchscreen, voice activated control technologies, or appropriate type of input unit. Further, in additional aspects (not illustrated in FIG. 1), the functionalities of display unit 109A and input unit 109B may be combined into a single device, e.g., a pressure-sensitive touchscreen display unit that presents interface elements and receives input from user 101. Client device 102 may also include a communications interface 109C, such as a wireless transceiver device, coupled to processor 104 and configured by processor 104 to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

Examples of client device 102 may include, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface device or unit, such as display unit 109A. In some instances, client device 102 may also establish communications with one or more additional computing systems or devices operating within computing environment 100 across a wired or wireless communications channel, e.g., via the communications interface 109C using any appropriate communications protocol. Further, user 101 may operate client device 102 and may do so to cause client device 102 to perform one or more exemplary processes described herein.

Further, each of merchant computing system 110 and FI computing system 130 may represent a computing system that includes one or more servers and one or more tangible, non-transitory memory devices storing executable code, application engines, or application modules. Each of the one or more servers may include one or more processors, which may be configured to execute portions of the stored code, application engines, or application modules to perform operations consistent with the disclosed exemplary embodiments. For example, as illustrated in FIG. 1, the one or more servers of FI computing system 130 may include server 132 having one or more processors configured to execute portions of the stored code, application engines, or application modules maintained within the one or more corresponding, tangible, non-transitory memories. In some instances, merchant computing system 110 and/or FI computing system 130 may correspond to a discrete computing system, although in other instances, one or more of merchant computing system 110 or FI computing system 130 may correspond to a distributed computing system having multiple, computing components distributed across an appropriate computing network, such as communications network 120 of FIG. 1, or those established and maintained by one or more cloud-based providers, such as Microsoft Azure™, Amazon Web Services™, or another third-party, cloud-services provider. Further, merchant computing system 110 and FI computing system 130 may also include one or more communications units, devices, or interfaces, such as one or more transceiver devices, coupled to the one or more processors for accommodating wired or wireless internet communication across communications network 120 with other computing systems and devices operating within computing environment 100 (not illustrated in FIG. 1).

By way of example, merchant computing system 110 may be associated with, or operated by, a corresponding merchant 111 that offers products or services for sale to one or more customers, such as, but not limited to, user 101 that operates client device 102. In some instances, merchant computing system 110 may exchange data programmatically with one or more application programs executed at client device 102, such as merchant application 106, and based on the programmatically exchanged data, client device 102 may perform any of the exemplary processes described herein to initiate a transaction to purchase one or more of the products or services offered for sale by merchant 111. In other instances, illustrated in FIG. 1, merchant computing system 110 may be operatively connected to one or more terminal devices, such as a point-of-sale (POS) terminal 112, across a corresponding wired or wireless channel of communications, such as, but not limited to, wired or wireless communications channel 116 or communications network 120. POS terminal 112 may, for example, include a computing device having one or more tangible, non-transitory memories that store data and/or software instructions, and one or more processors configured to execute the software instructions. Based on data exchanged programmatically with merchant computing system 110, the one or more processors of POS terminal 112 may execute the stored software instructions and perform any of the exemplary processes described herein to facilitate an initiation, by user 101 and/or client device 102, of the transaction to purchase one or more of the products or services offered for sale by merchant 111.

Further, and as described herein, FI computing system 130 may be associated with, or operated by, a financial institution that offers financial products or services to one or more customers, such as, but not limited to, user 101. The financial products or services may, for example, include a financial product issued to user 101 by the financial institution and available to fund the initiated purchase transaction, and examples of the payment instrument may include, but are not limited to, a loan product (e.g., an installment loan), a credit card account issued by the financial institution, a secured or unsecured credit product issued by the financial institution (e.g., an unsecured or secured line-of-credit, an unsecured personal loan, etc.), or a checking, savings, or other deposit account issued by and maintained at the financial institution.

In some instances, FI computing system 130 may perform any of the exemplary processes described herein to obtain, receive, or intercept a request-for-payment (RFP) message associated with a purchase transaction initiated by a first counterparty (e.g., user 101 of FIG. 1) and involving a corresponding second counterparty (e.g., merchant 111 associated with merchant computing system 110 of FIG. 1). By way of example, user 101 may initiate the purchase transaction based on input provided to POS terminal 112 in communication with merchant computing system 110 (e.g., via the corresponding input unit of POS terminal 112 and responsive to interface elements presented on the corresponding display unit of POS terminal 112), and as described herein, the received RFP message may be formatted and structured in accordance with one or more standardized data-exchange protocols, such as the ISO 20022 standard for electronic data exchange between financial institutions. Further, and based on elements of mapping data that characterize a structure, composition, or format of one or more data fields of the ISO-20022-compliant RFP message, FI computing system 130 may perform any of the exemplary processes described herein to decompose the received RFP message and obtain data characterizing user 101, merchant 111 associated with merchant computing system 110, and additionally, or alternatively, the initiated purchase transaction.

For example, the obtained data (e.g., "decomposed field" data) may include one or more of: (i) customer data identifying user 101, such as a unique customer identifier (e.g., a customer name, an alphanumeric login credential, etc.) and a postal address; (ii) payment data characterizing the real-time payment transaction, such as a transaction amount, a requested transaction date or time, an identifier of a product or service involved in the transaction, and an identifier of a customer account (e.g., from which the transaction amount will be debited) and a merchant account (e.g., to which the transaction amount will be credited); (iii) counterparty data identifying merchant 111, such as a counterparty name (e.g., a merchant name, etc.) and postal address; and (iv) transaction data that identifies a value of one or more parameters of corresponding ones of the initiated purchase transactions (e.g., a transaction amount, a transaction date or time, an identifier of one or more of the products or services involved in the initiated purchase transactions).

FI computing system 130 may also perform operations, described herein, to establish that a loan product, such as an unsecured installment loan, is available for provisioning to user 101 and appropriate to fund the initiated purchase transaction. For example, and based on an application of one or more internal qualification or underwriting criteria to data characterizing user 101, and interactions between user 101 and the financial institution or one or more unrelated financial institutions, and a use, or misuse, of financial product provisioned by the financial institution of the unrelated financial institutions, FI computing system 130 may perform any of the exemplary processes described herein to "pre-approve" user 101 for the loan product in an amount sufficient to fund the initiated purchase transaction. Further, FI computing system 130 may perform operations that generate a product notification (e.g., consistent with the ISO 20022 data-exchange protocol) characterizing the pre-approved credit or loan product and one or more determined terms and conditions, and provision the product notification to a device operable by user 101, such as client device 102, which may process the provisioned product notification and present, via display unit 109A, one or more interface elements that identify the pre-approved loan product and one or more determined terms and conditions and that prompt user 101 to accept, or alternatively, reject, the pre-approved loan product.

In some instances, and based on the acceptance of the pre-approved loan product by user 101, FI computing system 130 may perform any of the exemplary processes described herein to provision, or issue, the pre-approved loan product to user 101 and that fund the requested real-time payment using the issued fixed-rate installment loan. Further, FI computing system 130 may also perform operations that provision, to merchant computing system 110, data confirming the issuance of the pre-approved loan product to user 101 and the funding of the requested, real-time payment, and POS terminal 112 may present one or more interface elements representative of the provisioned data to user 101 via the corresponding display unit of POS terminal 112. Through a performance of one or more of the exemplary processes described herein, FI computing system 130 may perform operations that "convert" the requested real-time payment associated with the RFP message into a corresponding, targeted financing offer, which may be provisioned to user 101 via client device 102 in real-time and contemporaneously with the initiation of the corresponding purchase transaction, e.g., while user 101 is deposed proximate to a location of POS terminal 112.

To facilitate a performance of one or more of these exemplary processes, FI computing system 130 may maintain, within the one or more tangible, non-transitory memories, a data repository 134 that includes, but is not limited to, a request-for-payment (RFP) queue 135, a candidate financial product data store 136, a mapping data store 138, a customer data store 140, and a real-time payment (RTP) data store 142. RFP queue 135 may include one or more discrete RFP messages received by FI computing system 130 using any of the exemplary processes described herein. In some instances, the RFP messages maintained within RFP queue 135 may be prioritized in accordance with a time or date of receipt by FI computing system 130 or with requested payment data associated with each of the RFP messages, and each of the prioritized RFP messages may be associated with a corresponding temporal pendency. Further, FI computing system 130 may perform any of the exemplary processes described herein to provision elements of notification data associated with each of the RFP messages to a computing system or device associated with a corresponding customer (e.g., client device 102 associated with user 101), and FI computing system 130 may perform operations that maintain each of the RFP messages within RFP queue 135 until a receipt, at FI computing system 130, of confirmation data from corresponding ones of the computing systems or devices indicating an approval, or a rejection, of the corresponding requested payment, or until an expiration of the corresponding pendency period.

Candidate financial product data store 136 may include structured or unstructured data that characterizes one or more candidate financial products, such as, but not limited to, one or more the exemplary loan products described herein, available for provisioning to a customer, such as user 101, and appropriate to fund one or more of the requested, real-time payments associated with the intercepted or received RFP messages. In some instances, the elements of candidate financial product data store 136 may include, for each of the candidate financial products, a unique product identifier (e.g., a product name, etc.), data characterizing terms and conditions for each candidate financial product, and/or data characterizing internal qualification or underwriting procedures for each candidate financial product, as described herein.

Mapping data store 138 may include structured or unstructured data records that maintain one or more elements of field mapping data 138A. For example, and as described herein, FI computing system 130 may receive, obtain, or intercept one or more RFP messages, each of which may be formatted and structured in accordance with a corresponding, standardized data-exchange protocol, such as the ISO 20022 standard for electronic data exchange between financial institutions. In some instances, the one or more elements of field mapping data 138A may characterize a structure, composition, or format of the message data populating one or more data fields of the ISO-20022-compliant RFP message, or a corresponding RFP message compliant with an additional, or alternate, standardized data-exchange protocol.

In some instances, customer data store 140 may include structured or unstructured data records that maintain information identifying and characterizing one or more customers of the financial institution, and further, interactions between these customers and not only the financial institution, but also other unrelated third parties, such as the merchants or retailers described herein. For example, as illustrated in FIG. 1, customer data store 140 may include one or more elements of profile data 140A, which identify and characterize corresponding ones of the customers of the financial institution, one or more elements of account data 140B, which may identify and characterize one or more accounts held by the customers, one or more elements of transaction data 140C, which identify and characterize prior purchase or payment transactions involving the customers of the financial institution (such as, but not limited to, user 101), and one or more elements of third-party data 140D associated with corresponding customers of the financial institution.

By way of example, for a corresponding one of the customers, such as user 101, the elements of profile data 140A may include, but are not limited to, a customer identifier of user 101 (e.g., an alphanumeric login credential, a customer name, etc.), a postal address of user 101, and values of one or more demographic parameters characterizing user 101 (e.g., a customer age, customer profession, etc.). The accounts held by the customers of the financial institution may include, but are not limited to, an account associated with a loan product (e.g., an installment loan, etc.), a deposit account (e.g., a checking or a savings account issued by the financial institution), a credit-card account, or an account associated with an additional, or alternate, financial product, such as an unsecured personal loan, and the elements of account data 140B may include, for an account held by a corresponding one of the customers, such as user 101, the customer identifier of user 101, all or a portion of an account number (e.g., an actual account number, a tokenized account number, etc.), and data characterizing a status of the account (e.g., a current balance, an overdue balance, length of account existence, etc.) and interactions between user 101 and the account (e.g., amounts and dates of withdrawals, etc.). Further, the elements of transaction data 140C may include the customer identifier of user 101, data identifying one or more prior purchase or payment transactions initiated by user 101 (e.g., a unique, alphanumeric transaction identifier assigned by FI computing system 130), and may include values of transaction parameters that characterize each of the prior purchase or payment transactions, such as a transaction data or time, a transaction amount, an identifier of a corresponding counterparty, or an identifier of an account (e.g., an account number, etc.) that funds, or receives proceeds from, the prior purchase or payment transaction.

The elements of third-party data 140D may, for a corresponding one of the customers, such as user 101, include the customer identifier of user 101 and one or more elements of governmental, judicial, regulatory, or reporting data associated with, and characterizing user 101. By way of example, the elements of third-party data 140D associated with user 101 may include one or more elements of data generated and maintained by a governmental entity (e.g., governmental data) that identifies parcels of real estate, vehicles, or other tangible properties held or owned by user 101. Additionally, or alternatively, the elements of third-party data 140D associated with user 101 may include one or more elements of data generated and maintained by a reporting entity, such as credit-bureau data that includes a credit score or data characterizing one or more credit inquiries associated with user 101 during corresponding temporal intervals. In some examples, FI computing system 130 perform operations that receive, via a secure programmatic channel of communications, one or more of the customer-specific elements of third-party data 140D maintained within customer data store 140 from one or more computing systems associated with corresponding governmental, judicial, regulatory, or reporting entities in accordance with a predetermined temporal schedule, on a continuous, streaming basis, or in response to a requested generated and transmitted by FI computing system 130.

RTP data store 142 may include one or more elements of decomposed field data generated through a decomposition of corresponding ones of the received RFP messages, e.g., based on the elements of field mapping data 138A and through an implementation of any of the exemplary processes described herein.

Further, and to facilitate the performance of any of the exemplary processes described herein, FI computing system 130 may also maintain, within the one or more tangible, non-transitory memories, an application repository 144 that maintains, but is not limited to, a decomposition engine 146, a conversion engine 148, and a notification engine 150, each of which may be executed by the one or more processors of server 132.

For example, and upon execution by the one or more processors of FI computing system 130, executed decomposition engine 146 may perform any of the exemplary processes described herein to obtain field mapping data 138A from mapping data store 138, to apply field mapping data 138A to a received, obtained, or intercepted RFP message, and based on the application of field mapping data 138A to the RFP message, to decompose the RFP message and obtain elements of message data that not only identify and characterize each counterparty involved in an initiated purchase transaction (e.g., user 101 and merchant 111, as described herein), but that also characterize the initiated purchase transaction.

Upon execution by the one or more processors of FI computing system 130, executed conversion engine 148 may perform any of the exemplary processes described herein to analyze the elements of message data obtained from the message fields of the received RFP message, which characterize the purchase transaction initiated by user 101 and involving merchant 111 associated with merchant computing system 110 (e.g., the decomposed elements of customer, counterparty, merchant, transaction, or payment data described herein). Based on the analysis of the elements of message data, to executed conversion engine 148 may also perform any of the exemplary processes described herein to establish that a loan product, such as an unsecured installment loan, is available for provisioning to user 101 and appropriate to fund the initiated purchase transaction. In some instances, based on an application of one or more internal qualification or underwriting criteria to data characterizing user 101, and interactions between user 101 and the financial institution or one or more unrelated financial institution, and a use, or misuse, of financial product provisioned by the financial institution of the unrelated financial institutions, executed conversion engine 148 may perform any of the exemplary processes described herein to "pre-approve" user 101 for the loan product in an amount sufficient to fund the initiated purchase transaction.

Upon execution by the one or more processors of FI computing system 130, notification engine 150 may perform any of the exemplary processes described herein to generate one or more elements of notification data that include one or more of the information identifying the available and pre-approved loan product, the corresponding loan amount, and one or more determined terms and conditions. In some instances, when provisioned to client device 102 by FI computing system 130, the elements of notification data may cause one or more application programs executed by client device 102 (e.g., mobile banking application 108) to present interface elements within a corresponding digital interface that, among other things, offer the available and pre-approved loan product to user 101, and that prompt user 101 to accept the offered credit or loan product in accordance with the determined terms and conditions.

II. Computer-Implemented Processes for Provisioning Targeted Digital Content Associated with Initiated Data Exchanges in Real-Time Based on Structured Message Data As described herein, a customer of the financial institution, such as user 101, may elect to initiate a purchase of one or more products or services from a particular merchant, such as merchant 111. By way of example, merchant 111 may include a local home-improvement warehouse (e.g., "Lex's Home Improvement"), and user 101 may visit a physical location of merchant 111 on a particular date (e.g., Sep. 1, 2022), and may elect to purchase wallpaper, paint, and hardwood flooring in support of an ongoing renovation project at user 101's home within the Georgetown neighborhood of Washington, D.C. In some instances, an application program 202 (such as, but not limited to, an accounting application, etc.) executed by the one or more processors of merchant computing system 110 may perform operations that generate, and store within a locally accessible data repository, an invoice that, among other things, identifies the customer (e.g., a name or address of user 101, etc.), the home-improvement warehouse (e.g., a name, address, or phone number of merchant 111), each of the products purchased from the local home-improvement warehouse (e.g., the purchased wallpaper, paint, and hardwood flooring), unit costs associated with each of the purchased products, and aggregate costs associated with the purchase transaction.

Figure 2A:
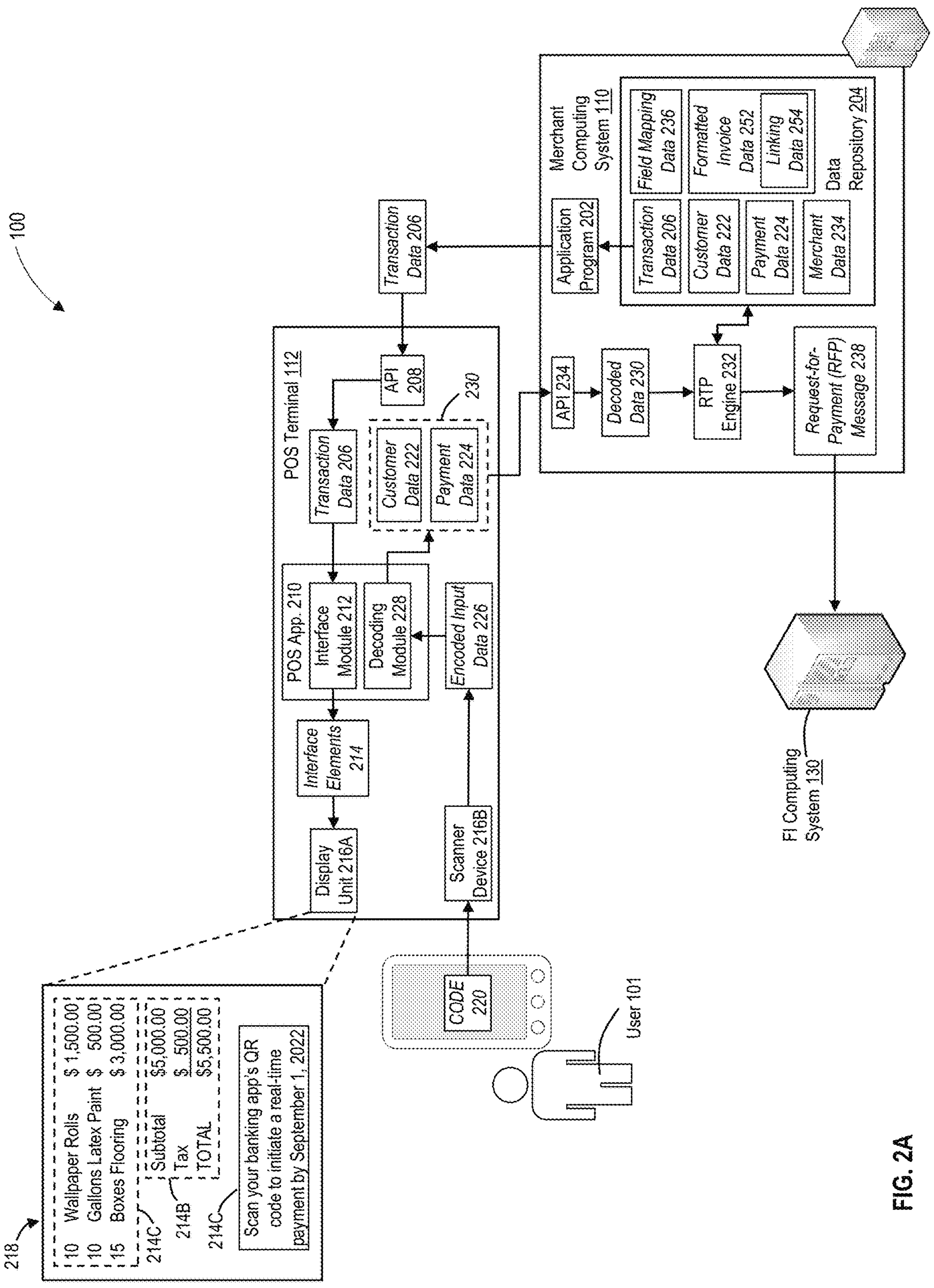
FIG. 2A is a block diagram illustrating a portion of an exemplary computing environment, in accordance with some exemplary embodiments.

Referring to FIG. 2A, and upon execution by the one or more processors of merchant computing system 110, executed application program 202 may perform operations that access a data repository 204 (e.g., as maintained within the one or more tangible, non-transitory memories of merchant computing system 110), and obtain one or more elements of transaction data 206, which identify and characterize each of the purchased products, unit costs associated with each of the purchased products, and aggregate costs associated with the purchase transaction. By way of example, user 101 may elect to purchase, from merchant 111, ten rolls of wallpaper having a unit cost of $150.00 per roll, ten gallons of latex paint having a unit cost of $50.00 per gallon, and fifteen boxes of hardwood flooring having a unit cost of $200.00 per box. In some instances, the elements of transaction data 206 may include, among other things: (i) a number of rolls of wallpaper purchased from merchant 111 and the corresponding unit cost (e.g., ten rolls at $150.00 per roll), a universal product code (UPC) or other unique identifier of the purchased rolls of wallpaper, and a total cost associated with the purchased rolls of wallpaper (e.g., $1,500.00); (ii) an amount of latex paint purchased from merchant 111 and the corresponding unit cost (e.g., ten gallons priced at $50.00 per gallon), a UPC or other unique identifier of the purchased latex paint, and a total cost associated with the purchased latex paint (e.g., $500.00); and (iii) a number of boxes of hardwood flooring purchased from merchant 111 and the corresponding unit cost (e.g., fifteen boxes at $200.00 per box), a UPC or other unique identifier of the purchased hardwood flooring, and a total cost associated with the purchased hardwood flooring (e.g., $3,000.00).

The elements of transaction data 206 may also include a subtotal associated with the purchased units of wallpapers latex paint, and hardwood flooring (e.g., $5,000.00), an amount of imposed sales tax on the purchased wallpaper, latex paint, and hardwood flooring (e.g., $500.00), and a total cost for the purchase of the wallpapers, latex paint, and hardwood flooring from merchant 111 (e.g., $5,500.00). The elements of transaction data 206 may also, in some instances, specify a date (e.g., Sep. 1, 2022) by which merchant 111 requests a payment from user 101 in the amount of the total, $5,500.00 cost of the purchased wallpaper, latex paint, and hardwood flooring. Referring back to FIG. 2A, executed application program 202 may perform operations that cause merchant computing system 110 to transmit all, or a selected portion, of the elements of transaction data 206 across wired or wireless communications channel 116 (or alternatively, across communications network 120) to POS terminal 112. In some instances, not illustrated in FIG. 2A, POS terminal 112 may also include communications interface, such as a transceiver device, coupled to one or more of the processors of POS terminal 112 and configured by the one or more processors to establish and maintain a wired or wireless channel of communications, such as wireless communications channel 116, with the communications interface of merchant computing system 110 in accordance with one or more communication protocols, such as WiFi®, Bluetooth®, NFC, a cellular communications protocol (e.g., LTE®, CDMA®, GSM®, etc.), or any other suitable wired or wireless communications protocol.

A programmatic interface established and maintained by POS terminal 112, such as application programming interface (API) 208, may receive the one or more elements of transaction data 206, and may route the one or more elements of transaction data 206 to a point-of-sale (POS) application 210, which may be executed by the one or more processors of FI computing system 130. In some instances, an interface module 212 of executed POS application 210 may receive the elements of transaction data 206, and may process the received elements of elements of transaction data 206 and generate one or more interface elements 214 that, when presented to user 101 by a display unit 216A of POS terminal 112, provide a graphical representation of the products purchased from the merchant 111 (e.g., the purchased wallpaper, paint, and hardwood flooring), unit costs associated with each of the purchased products, and aggregate costs associated with the now-initiated purchase transaction, and prompt user 101 to provision payment for the purchased products. By way of example, display unit 109A may include, but is not limited to, an LCD display unit, a pressure-sensitive touchscreen display unit, or other appropriate type of display unit.

As illustrated in FIG. 2A, executed interface module 212 may provide interface elements 214 as an input to display unit 216A of POS terminal 112, and display unit 216A may perform operations that render all, or a selected subset of, interface elements 214 for presentation to user 101 within a corresponding digital interface, such as digital interface 218. By way of example, digital interface 218 may include interface elements 214A, which identify each of the purchased products and the total costs associated with each of the purchased products (e.g., the purchase of ten rolls of wallpaper at a total cost of $1,500.00, the purchase of ten gallons of latex paint having at a total cost of $500.00, and the purchase of fifteen boxes of hardwood flooring at a total cost $3,000.00), and interface elements 214B, which identify the subtotal associated with the purchased wallpaper, latex paint, and hardwood flooring (e.g., $5,000.00), the amount of imposed sales tax (e.g., $500.00), and the total cost of the purchase transaction (e.g., $5,500.00).

Digital interface 218 may also include one or more additional interface elements 214C that prompt user 101 to provide input to POS terminal 112 that confirms an intention to fund the purchase transaction using a real-time payment debited from a funding account on or before the requested, Sep. 1, 2022, payment date, e.g., through a performance of any of the exemplary RTP processes described herein. By way of example, and based on input provided to client device 102 by user 101 (e.g., via input unit 109B), the one or more processors of client device 102 may execute mobile banking application 108, and executed mobile banking application 108 may generate a matrix barcode, such as a QR code 220, that encodes elements of customer data 222 identifying user 101 and elements of payment data 224 identifying the funding account associated with the real-time payment. The elements of customer data 222 may, in some instances, include a unique customer identifier associated with user 101 (e.g., an alphanumeric character string assigned to user 101 by merchant computing system 110, etc.), a full name of user 101 (e.g., "John Q. Smith"), and/or a postal address of user 101 ("3108 N Street NW, Washington, D.C., 20007, US").

Further, and as described herein, the funding account may correspond to a payment instrument held by user 101 and available to fund the $5,500.00 purchase of the wallpaper, latex paint, and hardwood flooring from merchant 111. Examples of the payment instrument held by user 101 may include, but are not limited to, a deposit account (e.g., a checking or savings account, etc.) or a credit-card account issued to user 101 by a corresponding financial institution (e.g., the financial institution associated with FI computing system 130), and the elements of payment data 224 may include, but is not limited to, all or a portion of a corresponding account number (e.g., an actual or tokenized account number) and in some instances, a corresponding expiration data and/or corresponding card verification code (e.g., associated with a credit-card account), or a corresponding routing number (e.g., associated with a deposit account).

Executed mobile banking application 108 cause client device 102 to render the generated QR code 220 within a portion of a corresponding digital interface (e.g., via a display unit 109A of client device 102), and in some instances, user 101 may position client device 102 such that presented matrix barcode is disposed proximate to an input unit, such as optical scanner device 216B, incorporated into, or communicatively coupled to, POS terminal 112. In some instances, optical scanner device 216B may be coupled to one or more of the processors of POS terminal 112 and configured by the one or more processors of POS terminal 112 to interrogate and scan presented QR code 220 and generate corresponding elements of encoded input data 226 associated with now-scanned QR code 220. Examples of optical scanner device 216B may include, but are not limited to, a scanning device using a red light source or a charge-coupled device incorporating a red laser.

For example, the elements of encoded input data 226 may confirm the intention of user 101 to fund the purchase transaction using the real-time payment debited from the funding account on or before the requested, Sep. 1, 2022, payment date, and as illustrated in FIG. 2A, optical scanner device 216B may provision the elements of encoded input data 226 to a decoding module 228 of executed POS application 210. In some instances, executed decoding module 228 may apply one or more decoding processes appropriate to QR code 220 to the elements of encoded input data 226, and based on the application of the appropriate decoding processes to the elements of encoded input data 226, executed decoding module 228 may generate decoded data 230 that includes, among other things, the elements of customer data 222 and payment data 224 described herein. Executed decoding module 228 may also perform operations that cause POS terminal 112 to transmit portions of decoded data 230, including the elements of customer data 222 and payment data 224, across wired or wireless communications channel 116 (or alternatively, across communications network 120) to merchant computing system 110. In some instances, although not illustrated in FIG. 2A, executed decoding module 228 may also perform operations that encrypt all, or a portion, of the elements of decoded data 230 using an appropriate encryption key (e.g., a public cryptographic key of merchant computing system 110, etc.) prior to transmission across wired or wireless communications channel 116 (or alternatively, across communications network 120).

A programmatic interface established and maintained by the one or more processors of merchant computing system 110, such as application programming interface (API) 231, may receive the element of decoded data 230, including the elements of customer data 222 and payment data 224, and may route the elements of decoded data 230 to a real-time payment (RTP) engine 232 executed by the one or more processors of merchant computing system 110. In some instances, as described herein, all, or a selected portion, of the elements of decoded data 230 may be encrypted, and executed RTP engine 232 may perform operations that decrypt the encrypted portions of decoded data 230 using a corresponding, and appropriate, decryption key, such as a private cryptographic key associated with merchant computing system 110. Executed RTP engine 232 may also perform operations that obtain the elements of customer data 222 and payment data 224 from the elements of decoded data 230, and store the elements of customer data 222 and payment data 224 within the one or more tangible, non-transitory memories of merchant computing system 110, e.g., within a portion of data repository 204.

As described herein, the elements of customer data 222 may include the unique customer identifier associated with user 101 (e.g., the alphanumeric character string assigned to user 101 by merchant computing system 110, etc.), the full name of user 101 (e.g., "John Q. Smith"), and/or the postal address of user 101 ("3108 N Street NW, Washington, D.C., 20007, US"), and the elements of payment data 224 may include all or a portion of the corresponding account number of the funding account held by user 101 (e.g., the actual or tokenized account number) and in some instances, the corresponding expiration data and/or corresponding card verification code (e.g., associated with a credit-card account held by user 101), or the corresponding routing number (e.g., associated with a deposit account held by user 101). Executed RTP engine 232 may also obtain, from data repository 204, the one or more elements of transaction data 206 described herein, which identify and characterize each of the purchased products, unit costs associated with each of the purchased products, and aggregate costs associated with the purchase of the wallpaper, latex paint, and hardwood flooring from merchant 111.

Further, as illustrated in FIG. 2A, executed RTP engine 232 may also obtain, from data repository 204, one or more elements of merchant data 234 and one or more elements of field mapping data 236. In some instances, the one or more elements of merchant data 234 may include, but are not limited to, an identifier of merchant 111 (e.g., a merchant name, such as "Lex's Home Improvement"), a postal address associated with merchant 111 (e.g., an actual postal address, such as "6201 Arlington Boulevard, Falls Church, VA, 22044, US" etc.), and information that identifies a financial services account associated with merchant 111 and capable of receiving proceeds from one or more of the purchased transactions described herein (e.g., an account number, a routing number, etc.). Further, the one or more elements of field mapping data 236 may characterize a structure, composition, or format of one or more data fields of an ISO-20002-compliant RFP message, such as those described herein, and additionally, or alternatively, an RFP message compliant with another standardized data-exchange protocol.

In some instances, based on portions of the elements of transaction data 206, customer data 222, payment data 224, and merchant data 234, executed RTP engine 232 may perform any of the exemplary processes described herein to generate a request-for-payment (RFP) message 238 that is structured and formatted in accordance with the one or more elements of field mapping data 236 and that requests a payment from user 101 for the initiated purchase transaction (e.g., the $5,500.00 purchase of the wallpaper, latex paint, and hardwood flooring on Sep. 1, 2022) not at a close of a corresponding business or calendar day, but instead in real-time and contemporaneously with the initiation of the purchase transaction by user 101 and the provisioning of QR code 220 to optical scanner device 216B of POS terminal 112. As described herein, RFP message 238 may be structured in accordance with the ISO 20022 standard for electronic data exchange between financial institutions, and in some examples, RFP message 238 may correspond to a pain.013 message, as specified within the ISO 20022 standard. Further, and as described herein, the one or more elements of field mapping data 236 may characterize a structure, composition, or format of one or more data fields of ISO-20002-compliant RFP message 238 (e.g., the one or more data fields within the pain.013 message).

By way of example, ISO-20022-compliant RFP message 238 may include among other things: (i) message fields populated with data specifying a full name and postal address of user 101; (ii) message fields populated with data identifying the funding account (e.g., the payment instrument) selected by user 101 to fund the initiated purchase transaction; (iii) message fields populated with data specifying a name and postal address of merchant 111; (iv) message fields populated with data identifying a financial services account held by merchant 111 and available to receive processed from the requested payment; and (v) message fields populated with one or more parameter values that characterize the initiated purchase transaction, a requested payment method, and/or a requested payment date. Further, ISO-20022-compliant RFP message 238 may also include one or more structured or unstructured message fields that specify additional information associated with the initiated purchase transaction.

Examples of the additional information include, but are not limited to, information identifying a product or service involved in the initiated purchase transaction, or a link to remittance data associated with the initiated transaction (e.g., a link to a PDF or HTML invoice identifying the merchant/vendor, the geographic location of the merchant/vendor, or the purchased product or service). In some instances, as described herein, the link may include a long-form uniform resource locator (URL) into which certain elements of positional or customer data may be embedded, such as, but not limited to, the actual postal code of merchant 111 or the unique identifier of user 101. In other instances, the link may include a shortened URL, such as a tiny URL, actionable by FI computing system 130 using any of the exemplary processes described herein.

In some instances, executed RTP engine 232 may parse the elements of transaction data 206, customer data 222, payment data 224, and merchant data 234, and may perform operations that populate the message fields of RFP message 238 with corresponding elements of transaction data 206, customer data 222, payment data 224, and merchant data 234 in accordance with field mapping data 236. For example, executed RTP engine 232 may parse transaction data 206 and obtain data that specifies a requested payment date (e.g., Sep. 1, 2022), a requested payment amount (e.g., the $5,500.00 total purchase price), and a currency associated with that requested payment amount (e.g., U.S. dollars). Executed RTP engine 232 may also format the requested payment data, the requested payment amount, and the requested payment currency in accordance with portions of field mapping data 236. As illustrated in FIG. 2B, executed RTP engine 232 may perform operations that populate message field 240 of RFP message 238 with the formatted payment date (e.g., "2022-09-01") and message fields 242 of RFP message 238 with respective ones of the formatted payment amount (e.g., "5,500.00") and formatted payment current (e.g., "USD").

Further, executed RTP engine 232 may parse the elements of customer data 222 to obtain a name of user 101 (e.g., "John Q. Stone") and a postal address associated with user 101 (e.g., "2220 Eye Street NW, Washington, D.C., 20037, US"), and may parse the elements of payment data 224 to obtain information that identifies (e.g., an "identification" of) the funding account selected by user 101 to fund the purchase transaction (e.g., the corresponding account number "XXXX-1234-5678-9012"). In some instances, executed RTP engine 232 may format the obtained customer name, the obtained customer address, and the obtained identification of the payment instrument in accordance with portions of field mapping data 236, and as illustrated in FIG. 2B, executed RTP engine 232 may perform operations that populate message fields 244 of RFP message 238 with respective portions of the formatted customer name and customer address, and that populate message field 246 with the formatted identification of the selected payment instrument.

Executed RTP engine 232 may also parse the elements of merchant data 234 to obtain a name of merchant 111 (e.g., "Lex's Home Improvement"), a postal address associated with merchant 111 (e.g., "6201 Arlington Boulevard, Falls Church, VA, 22044, US"), and an identifier of a financial services account associated with merchant 111 and capable of receiving proceeds from one or more of the purchased transactions (e.g., the account number "XXXX-9012-3456-7890"). In some instances, executed RTP engine 232 may format the obtained merchant name, the obtained merchant address, and the obtained identifier of the merchant account in accordance with portions of field mapping data 236, and as illustrated in FIG. 2B, executed RTP engine 232 may perform operations that populate message fields 248 of RFP message 238 with respective portions of the formatted merchant name and merchant address, and that populate message field 250 with the formatted identification of the merchant account.

Further, and as described herein, RFP message 238 may also include one or more message fields that specify remittance information associated with the initiated purchase transaction, such as, but not limited to, a link to a PDF or HTML invoice identifying merchant 111, a postal address associated with merchant 111, or the purchased wallpaper, latex paint, and hardwood flooring. For example, and upon receipt of the elements of decoded data 230 from POS terminal 112, merchant computing system 110 (e.g., via executed RTP engine 232 or one or more other executed application programs, engines, or modules) may generate one or more elements of formatted invoice data 252 that identify merchant 111 (e.g., "Lex' Home Improvement"), a postal address associated with merchant 111 (e.g., "6201 Arlington Boulevard, Falls Church, VA, 22044, US"), and one or more elements of transaction data 206 (e.g., names and/or UPCs of the purchased wallpaper, latex paint, and hardwood flooring, the $5,000.00 subtotal of the purchase transaction, the $500.00 sales tax, the $5,500.00 total purchase amount, etc.) or payment data 224 (e.g., a tokened portion of the account number of the selected funding account, etc.). In some instances, merchant computing system 110 may perform operations that store the elements of formatted invoice data 252 within a portion of data repository 204, along with corresponding elements of linking data 254 that include, among other things, a long-form or shortened URL associated with the stored elements of formatted invoice data 252 (e.g., that point to the storage location of formatted invoice data 252 within data repository 204).

In some instances, executed RTP engine 232 may perform operations that obtain linking data 254 from data repository 204, and that process and package all, or a selected portion, of linking data 254 within a corresponding unstructured message field of RFP message 238. For example, linking data 254 may include a long-form URL (e.g., http://www.example.com/receipt?custid=1234'?zip=22044) that points to formatted invoice data 252 maintained within data repository 204 and includes the actual postal code of merchant 111 (e.g., "22044") and the customer identifier assigned to user 101 by merchant computing system 110 (e.g., "1234"), and as illustrated in FIG. 2B, executed RTP engine 232 may parse linking data 254, obtain the long-form URL, and package the long-form URL into an unstructured message field 256 of RFP message 238. The disclosed embodiments are, however, not limited to RFP messages populated with these exemplary elements of customer, merchant, payment, transaction, and additional remittance data, and in other examples, RFP message 238 may include any additional, or alternate, message fields specified within field mapping data 236 and consistent with the ISO 20022 standard for electronic data exchange, and executed RTP engine 232 may populate these message fields with any additional, or alternate, structured and formatted elements of customer, merchant, payment, transaction, or additional remittance data appropriate to RFP message 238 and field mapping data 236.

As illustrated in FIG. 2A, executed RTP engine 232 may perform operations that cause merchant computing system 110 to broadcast now-populated RFP message 238 across communications network 120 to one or more computing systems or devices within computing environment 100 that are associated with participants in the RTP ecosystem, such as, but not limited to, FI computing system 130, a computing system associated with a financial institution, or one or more computing systems associated with a real-time payment (RTP) processing network, such as a clearinghouse system. In some instances, and prior to broadcasting now-populated RFP message 238 across communications network 120, executed RTP engine 232 may perform operations that encrypt RFP message 238 using a corresponding encryption key, and examples of the corresponding encryption key include, but are not limited to, a public cryptographic key associated with FI computing system 130.

For example, merchant computing system 110 may broadcast RFP message 238 directly across communications network 120 to FI computing system 130. In other examples, merchant computing system 110 may broadcast RFP message 238 across communications network 120 to one or more intermediate computing systems, such as, but not limited to, the clearinghouse system associated with the RTP processing network. The clearinghouse system may, for example, parse RFP message 238 to access, within a corresponding one of the message fields, tokenized account data associated with the customer-specified funding account, and based on the tokenized account data, the clearinghouse system may identify the financial institution of user 101. The financial institution of user 101 may, for example, represent a participant in the RTP processing network, and the clearinghouse system may perform operations that obtain a network address associated with one or more computing systems of the financial institution of user 101 (e.g., a network address of FI computing system 130), and the clearinghouse system may route RFP message 238 across communications network 120 to FI computing system 130 based on the obtained network address.

In some instances, when executed by the one or more processors of merchant computing system 110, executed RTP engine 232 may perform any of the exemplary processes described herein to populate the structured message fields of RFP message 238 with corresponding elements of transaction data 206, customer data 222, payment data 224, merchant data 234, and linking data 254 in accordance with field mapping data 236 (e.g., in accordance with the ISO 20002 data-exchange protocol). The disclosed embodiments are, however, not limited to the generation and population of ISO-20022-compliant RFP messages by merchant computing system 110 and in other instances, an additional, or alternate, computing system associated with the RTP processing network based on portions of the elements of transaction data 206, customer data 222, payment data 224, merchant data 234, and linking data 254 maintained at merchant computing system 110.

By way of example, merchant computing system 110 may perform operations, not illustrated in FIG. 2A, that package all, or a selected subset, of the elements of transaction data 206, customer data 222, payment data 224, merchant data 234, and linking data 254 into corresponding portions of a payment request, which merchant computing system 110 may transmit across communications network 120 to a computing system associated with, or operated by, a financial institution of merchant 111 (e.g., a "merchant FI computing system"). The financial institution of merchant 111, and the merchant FI computing system, may each represent participants in the RTP processing network, and the merchant FI computing system may receive the payment request from merchant computing system 110 and may perform operations that obtain the elements of transaction data 206, customer data 222, payment data 224, merchant data 234, and linking data 254 from the payment request.

Based on the obtained elements of transaction data 206, customer data 222, payment data 224, merchant data 234, and linking data 254, the merchant FI computing system (not illustrated in FIG. 2A) may perform any of the exemplary processes described herein to generate an ISO-20022-compliant request-for-payment (RFP) message that requests a real-payment of $5,500 from the customer-specified funding account for the purchase transaction involving the wallpaper, paint, and hardwood flooring. As described herein in reference to RFP message 238, the ISO-20022-compliant RFP message generated by the merchant FI computing system (not illustrated in FIG. 2A) may include, within one or more structured or unstructured message field, information that identifies and characterizes the customer, the local home-improvement warehouse, the purchase transaction involving the wallpaper, paint, and hardwood flooring, and the requested payment, such as, but not limited to, the elements of transaction data 206, customer data 222, payment data 224, and merchant data 234 described herein. Further, each of the ISO-20022-compliant RFP messages may also include one or more structured or unstructured data fields populated with a link (e.g., a short-form or tiny URL or a long-form URL specified within the elements of linking data 254) to remittance data associated with the requested payment, such as a link to a PDF or HTML receipt for the purchase transaction involving the wallpaper, paint, and hardwood flooring maintained at merchant computing system 110 (e.g., as maintained within formatted invoice data 252). The merchant FI computing system may also perform any of the exemplary processes described herein to broadcast the generated RFP message directly across communications network 120 to FI computing system 130, or across communications network 120 to one or more of intermediate computing systems associated with the RTP processing network, such as the clearinghouse system described herein.

Figure 3:
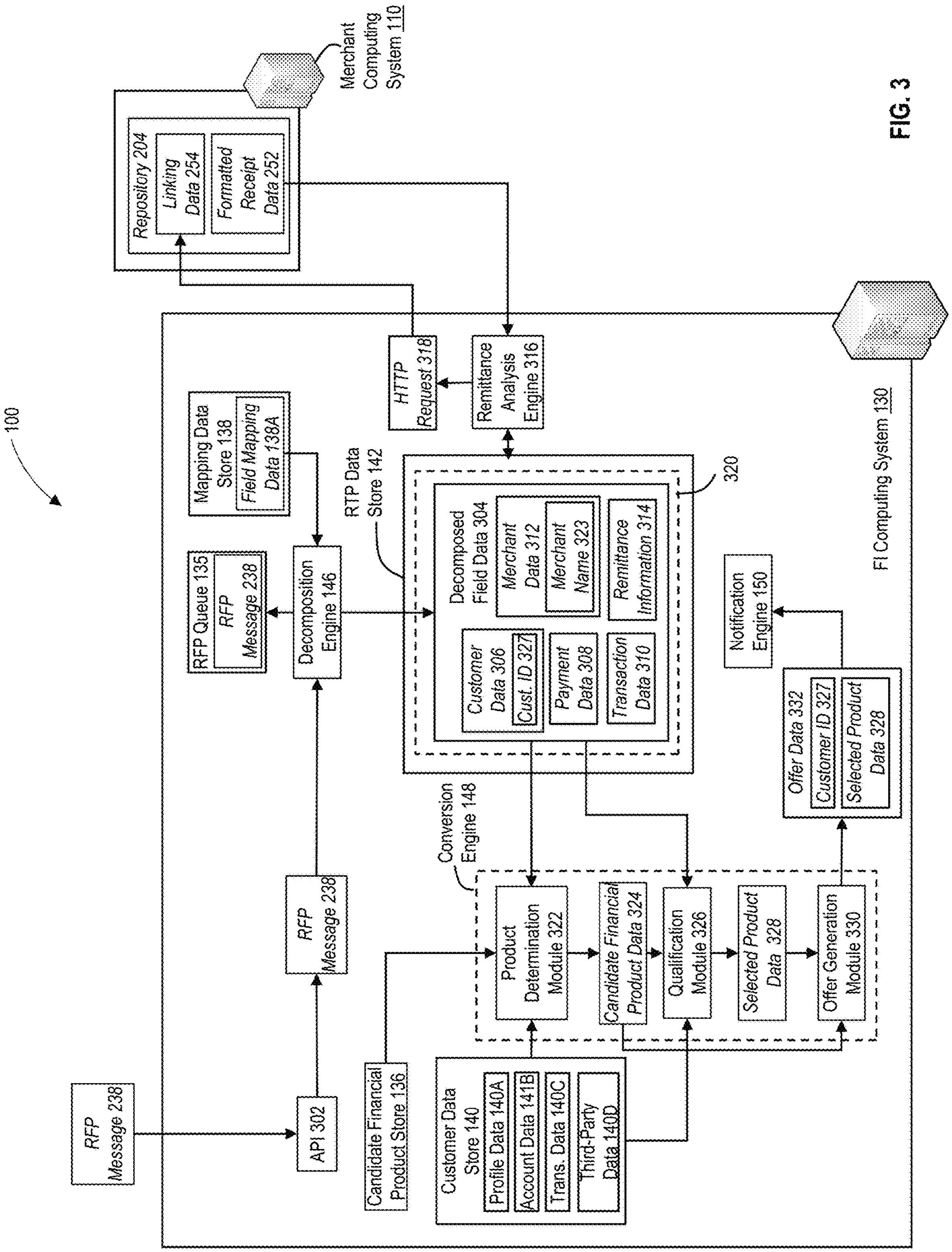
FIGS. 3, 4A, 4B, 4C, and 4D are block diagrams illustrating portions of an exemplary computing environment, in accordance with some exemplary embodiments.

Referring to FIG. 3, a programmatic interface established and maintained by FI computing system 130, such as application programming interface (API) 302, may receive RFP message 238, and may route RFP message 238 to decomposition engine 146, which may be executed by the one or more processors of FI computing system 130. In some examples, FI computing system 130 may receive RFP message 238 directly across communications network 120 via a channel of communications established programmatically between API 302 and executed RTP engine 232 of merchant computing system 110. In other examples, FI computing system 130 may receive RFP message 238 across communications network 120 from one or more of computing systems or devices associated with the participants in the RTP processing network, such as, but not limited to, the clearinghouse system described herein. Further, and as described herein, one or more portions of RFP message 238 may be encrypted (e.g., using a public cryptographic key associated with FI computing system 130), and executed decomposition engine 146 may perform operations that access a corresponding decryption key maintained within the one or more tangible, non-transitory memories of FI computing system 130 (e.g., a private cryptographic key associated with FI computing system 130), and that decrypt the encrypted portions of RFP message 238 using the corresponding decryption key.

In some instances, executed decomposition engine 146 may store RFP message 238 (in decrypted form) within a corresponding portion of data repository 134, e.g., within RFP queue 135. Executed decomposition engine 146 may also perform operations that access mapping data store 138 (e.g., as maintained within data repository 134), and obtain one or more elements of field mapping data 138A that characterize a structure, composition, or format of one or more data fields of RFP message 238. For example, and as described herein, RFP message 238 may include message fields consistent with the ISO 20022 standard for electronic data exchange between financial institutions, and each of the message fields may be populated with data structured and formatted in accordance with the ISO 20022 standard.

As described herein, RFP message 238 may be associated with a real-time payment requested from user 101 by merchant 111 for a $5,500.00 purchase of the wallpaper, latex paint, and hardwood flooring by user 101 on Sep. 1, 2022. By way of example, RFP message 238 may include, but is not limited to, a message field populated with data specifying the requested payment date of September 1st (e.g., message field 240 of FIG. 2B) and message fields populated within data specifying the requested payment amount of US $5,500.00 (e.g., message fields 242 of FIG. 2B). RFP message 238 may also include, but is not limited to, message fields populated with data that identify and characterize user 101 (e.g., message fields 244 of FIG. 2B) and merchant 111 (e.g., message fields 248 of FIG. 2B), along with additional message fields populated with data that identify the funding account selected by user 101 to fund the purchase transaction (e.g., message field 246 of FIG. 2B) and the financial services account associated with merchant 111 and capable of receiving proceeds from the purchase transaction (e.g., message field 250 of FIG. 2B). Further, and as described herein, RFP message 238 may include one or more additional data fields populated with structured or unstructured remittance data, such as, but not limited to, a long-form URL that points to formatted invoice data 252 maintained within data repository 204 of merchant computing system 110 (e.g., message field 244 of FIG. 2B, which may include http://www.example.com/receipt?custid='1234'?zip='22044'). The disclosed embodiments are, however, not limited to structured or unstructured remittance data that includes a long-form URL, and in other instances, the structured or unstructured remittance data may include one or more identifiers (e.g., UPCs, etc.) of the purchased products or a shortened URL that points to formatted invoice data 252.

Based on the obtained elements of field mapping data 138A, executed decomposition engine 146 may perform operations that parse RFP message 238 and obtain elements of decomposed field data 304 that identify and characterize user 101, merchant 111, and the requested payment for the corresponding purchase transaction, such as the purchase of the wallpaper, latex paint, and hardwood flooring initiated by user 101 on Sep. 1, 2022. In some instances, and through the performance of these exemplary operations, executed decomposition engine 146 may "decompose" the structured or unstructured data populating the message fields of RFP message 238 in accordance with field mapping data 138A, and generate the elements of decomposed field data 304 that include, but is not limited to, elements of customer data 306, payment data 308, transaction data 310, and merchant data 312.

By way of example, and based on the elements of field mapping data 138A, executed decomposition engine 146 may determine that message fields 244 of RFP message 238 include data that identifies and characterizes user 101, and may perform operations that obtain, from message fields 244, a customer name of user 101 (e.g., "John Q. Stone") and a customer address of user 101 (e.g., "2220 Eye Street NW, Washington, D.C., 20037, US"). Further, as illustrated in FIG. 3, executed decomposition engine 146 may package the obtained customer name and address into corresponding portions of customer data 306.

Further, based on the elements of field mapping data 138A, executed decomposition engine 146 may determine that message fields 240 and 246 of RFP message 238 include data identifying respective ones of the requested payment date and the payment instrument selected by user 101 to fund the purchase transaction. In some instances, executed decomposition engine 146 may perform operations that obtain, from respective ones of message fields from message fields 240 and 246, the requested payment date of Sep. 1, 2022, and the information that identifies the selected payment instrument (e.g., the account number "XXXX-1234-5678-9012"), which executed decomposition engine 146 may package into corresponding portions of payment data 308. Executed decomposition engine 146 may also determine, based on the elements of field mapping data 138A, that message fields 242 of RFP message 238 include data identifying the requested payment amount and the currency associated with that requested payment amount. In some instances, executed RTP engine 232 may perform operations that obtain, from respective ones of message fields 242, data that identifies the $5,500.00 requested payment amount and the requested denomination in U.S. currency, and package the obtained data within corresponding portions of transaction data 310.

In some instances, and based on the elements of field mapping data 138A, executed decomposition engine 146 may determine that message field 248 includes data identifying and characterizing merchant 111, and that message field 250 includes data identifying the financial services account associated with merchant 111 and capable of receiving proceeds from the purchase transaction. Executed decomposition engine 146 may perform operations that obtain, from message fields 248, a name of merchant 111 (e.g., "Lex's Home Improvement") and a postal address associated with merchant 111 (e.g., "6201 Arlington Boulevard, Falls Church, VA, 22044, US"), and that obtain, from message field 250, the information identifying the financial services account associated with merchant 111 (e.g., the account number "XXXX-9012-3456-7890" of the merchant account). Further, executed decomposition engine 146 may perform additional operations that package the obtained merchant name, the obtained merchant address, and the obtained information identifying the merchant account into corresponding portions of merchant data 312.

Additionally, and as described herein, executed decomposition engine 146 may also determine, based on the elements of field mapping data 138A, that message field 256 of RFP message 238 includes structured or unstructured elements of remittance data that characterizes further the initiated purchase transaction, user 101, or merchant 111, and executed decomposition engine 146 may obtain the structured or unstructured elements remittance data from message field 244 and package the obtained elements of remittance data into corresponding portions of remittance information 314. For example, the elements of structured or unstructured remittance data may include the long-form URL that points to formatted invoice data 252 maintained within data repository 204 of merchant computing system 110, which includes, among other things, includes contact information of merchant 111 (e.g., address, phone number, web address, etc.), identifiers of the purchased wallpaper, latex paint, and hardwood flooring (e.g., product names, UPCs, etc.), purchased quantities and unit costs of the purchased products, and any imposed sales taxes or fees. As illustrated in FIG. 3, executed decomposition engine 146 may obtain the long-form URL from message field 244 of RFP message 238, and package that long-form URL into remittance information 314.

The disclosed embodiments are, however, not limited to elements of structured or unstructured remittance data that include a long-form URL pointing to formatted invoice data maintained within data repository 204 of merchant computing system 110. In other instances, the structured or unstructured remittance data maintained within message field 256 of RFP message 238 (or within additional, or alternate, message fields of RFP message 238) may include an additional, or alternate, long-form URL pointing to formatted invoice data maintained at merchant computing system 110 or at other computing systems within computing environment 100, a shortened URL (e.g., a tiny URL) actionable by FI computing system 130 and pointing to formatted invoice data maintained at merchant computing system 110 or at other computing systems within computing environment 100, or other elements of data that identify or characterize user 101, merchant 111, the requested payment, or the purchase transaction, such as UPCs of the purchased wallpaper, latex paint, and hardwood flooring.

In some instances, the one or more processors of FI computing system 130 may execute a remittance analysis engine 316, which may perform operations that, based on the long-form or shortened URL maintained within remittance information 314 of decomposed field data 304, programmatically access elements of formatted invoice data 252 maintained at merchant computing system 110, and that process the accessed elements of formatted invoice data 252 to obtain additional, or alternate, elements of customer data 306, payment data 308, transaction data 310, and merchant data 312. For example, remittance analysis engine 316 may access the long-form or shortened URL maintained within remittance information 314 (e.g., the short- or long-form URL described herein, etc.), and may process the long-form or shortened URL and generate a corresponding HTTP request 318 for the elements of formatted invoice data 252 maintained at Merchant computing system 110. Executed remittance analysis engine 316 may also perform operations that cause FI computing system 130 to transmit HTTP request 318 across communications network 120 to merchant computing system 110.

Merchant computing system 110 may, for example, receive HTTP request 318, and based on portions of HTTP request 318 and linking data 254 (e.g., based on a determined match or correspondence between the portions of HTTP request 318 and linking data 254), Merchant computing system 110 may perform operations that obtain the elements of formatted invoice data 252 from data repository 204, and that transmit the elements of formatted invoice data 252 across communications network 120 to FI computing system 130, e.g., as a response to HTTP request 318. Further, as illustrated in FIG. 3A, executed remittance analysis engine 316 may receive the elements of formatted invoice data 252 from merchant computing system 110, and may perform any of the exemplary processes described herein to parse the elements of formatted invoice data 252 (e.g., in a received format, such as a PDF or HTML form, or in a transformed or enhanced format, etc.) and obtain, from the parsed elements of formatted invoice data 252, one or more of the additional, or alternate, elements of customer data 306, payment data 308, transaction data 310, or merchant data 312. By way of example, executed remittance analysis engine 316 may apply one or more optical character recognition (OCR) processes or optical word recognition (OWR) processes to the elements of formatted invoice data 252 in PDF form to generate, or obtain, elements of textual content representative of the data that characterizes user 101, merchant 111, the requested payment, or the purchase transaction.

By way of example, executed remittance analysis engine 316 may perform operations that detect a presence one or more keywords within the generated elements of textual content (e.g., "UPC," "address," "subtotal," etc.), and may extract elements of the textual content associated with these keywords as corresponding ones of the additional, or alternate, elements of customer data 306, payment data 308, transaction data 310, or merchant data 312. In other examples, executed remittance analysis engine 316 may detect a presence of the additional, or alternate, elements of customer data 306, payment data 308, transaction data 310, or merchant data 312 within the generated textual content based on an application of one or more adaptively trained machine learning or artificial intelligence models to portions of the textual content, and examples of these adaptively trained machine learning or artificial intelligence models includes a trained neural network process (e.g., a convolutional neural network, etc.) or a decision-tree process that ingests input datasets composed of all, or selected portions, of the textual content. The disclosed embodiments are, however, not limited to exemplary processes for detecting and extracting one or more of the additional, or alternate, elements of customer data 306, payment data 308, transaction data 310, or merchant data 312 from the generated textual content, and in other instances, executed remittance analysis engine 316 may perform any additional, or alternate, process for identifying one or more of the additional, or alternate, elements of customer data 306, payment data 308, transaction data 310, or merchant data 312 within the textual content derived from the processing of the elements of formatted invoice data 252 in PDF format.

Further, and as described herein, the elements of formatted invoice data 252 may be structured in HTML form, and may include metadata that identify and characterize user 101 (e.g., the customer name or address described herein, etc.), merchant 111 (e.g., the merchant name or address described herein, etc.), the requested payment (e.g., a payment amount, etc.), or the purchase transaction, such as UPCs of the purchased wallpaper, latex paint, and hardwood flooring Executed remittance analysis engine 316 may perform operations that detect one or more of the elements of metadata within the elements of formatted invoice data 252, and that obtain, from the elements of metadata, additional, or alternate, elements of customer data 306, payment data 308, transaction data 310, or merchant data 312, as described herein. The disclosed embodiments are, however, not limited to these exemplary processes for detecting and extracting the additional, or alternate, elements of customer data 306, payment data 308, transaction data 310, or merchant data 312 from HTML-formatted invoice data, and in other instances, executed remittance analysis engine 316 may perform any additional, or alternate, process detecting and obtaining data from the elements of formatted invoice data 252 structured in HTML form, including, but not limited to, an application of one or more screen-scraping processes to portions of formatted invoice data 252 structured in HTML form.

In some instances, executed decomposition engine 146 may perform operations that store decomposed field data 304, which includes the element of customer data 306, payment data 308, transaction data 310, merchant data 312, and remittance information 314, within a corresponding portion of data repository 134, such as within elements 320 of RTP data store 142. Executed decomposition engine 146 may also access RFP queue 135, and determine whether RFP queue 135 includes additional RFP messages awaiting decomposition. For example, FI computing system 130 may receive additional RFP messages (not illustrated in FIG. 2A), and may store these additional RFP messages within RFP queue 135 on a continuous and ongoing basis (e.g., throughout each day). If the executed decomposition engine 146 were to determine that one or more of the additional RFP messages within RFP queue 135 await processing, executed decomposition engine 146 may obtain one of these additional RFP messages, and may perform any of the exemplary processes described herein to decompose the message fields of the obtained, additional RFP message in accordance with the elements of field mapping data 138A, to obtain corresponding elements of customer data, payment data, transaction data, merchant data, and remittance information, and to package the customer data, payment data, transaction data, merchant data, and remittance information into additional, decomposed field data for storage within an additional element of RTP data store 142.

Further, executed decomposition engine 146 may provide decomposed field data 304 as an input to conversion engine 148, which may be executed by the one or more processors of FI computing system 130. In some instances, executed conversion engine 148 may perform any of the exemplary processes described herein to (i) determine that a candidate loan product is available to fund the $5,500.00 real-time payment requested from user 101 by merchant 111 on Sep. 1, 2022, and (ii) to "pre-approve" user 101 for the candidate financial product in accordance with a corresponding set of candidate terms and conditions, based on portions of decomposed field data 304, either alone or in conjunction with additional data associated with user 101, client device 102, merchant 111, or previously initiated transactions involving user 101 and client device 102. Through a performance of one or more of the exemplary processes described herein, FI computing system 130 may perform operations that "convert" the requested real-time payment associated with RFP message 238 into a corresponding, targeted financing offer associated with the pre-approved loan product, which may be provisioned to user 101 via client device 102 in real-time and contemporaneously with the initiation of the corresponding purchase transaction, e.g., while user 101 is deposed proximate to a location of POS terminal 112.

For example, referring back to FIG. 3, a product determination module 322 of executed conversion engine 148 may perform operations that access candidate financial product store 136 and, identify one or more of the candidate financial products appropriate to fund the purchase of the wallpaper, latex paint, and hardwood flooring from merchant 111, e.g., the $5,500 purchase from "Lex's Home Improvement" on Sep. 1, 2022. In some instances, executed product determination module 322 may obtain information that identifies and characterizes each of the identified candidate financial products from candidate financial product store 136, and the obtained information may, for each of the candidate financial products, include a corresponding product identifier (e.g., a product name or an alphanumeric identifier, etc.) and one or more internal qualification or underwriting criteria that establish an availability of the candidate financial product to user 101 and enable the financial institution to establish purchase-, merchant, and/or customer-specific terms and conditions.

The purchase-, merchant, and/or customer-specific terms and conditions may include, for example, a minimum average monthly balance in one or more deposit accounts, an average payroll deposit amount received by user 101's financial accounts on a daily, weekly, yearly, or monthly basis, and additionally, or alternatively, an average amount saved by user 101 (e.g., as a difference between the payroll deposit amount and the payment amounts over a particular temporal interval) for that candidate financial product. For each of the candidate financial products, executed product determination module 322 may generate candidate financial product data 324 identifying and charactering the corresponding candidate financial product and, additionally or alternatively, the one or more internal qualification criteria, including any of the corresponding purchase-, merchant, and/or customer-specific terms and conditions.

In some instances, executed product determination module 322 may perform operations that access one or more of customer data 306, payment data 308, transaction data 310, and merchant data 312 within decomposed field data 304 to determine an availability of a particular candidate financial product to user 101. For example, executed product determination module 322 may perform operations that access the transaction data 310 with decomposed field data 304, and determine a payment amount (e.g., the $5,500.00) for the requested payment. Based on the payment amount, executed product determination module 322 may determine that one or more of the candidate financial products characterized within candidate financial product store 136 are appropriate to fund the requested payment, and may, additionally or alternatively, determine that one or more other candidate financial products characterized within candidate financial product store 136 are inappropriate to fund the requested payment. For example, and to be available to fund the requested, $5,500.00 payment, each candidate financial product, including the candidate loan products described herein, may be associated with a minimum loan amount disposed at, or above, a threshold value (e.g., the $5,500.00 payment amount of the requested payment).

Further, in some examples, product determination module 322 may perform operations that determine an appropriateness of a particular candidate financial product to fund the requested payment based on the access merchant data 312 within decomposed field data 304. For example, a candidate financial product, such as a candidate loan product, may associated with, and may be available to fund purchases involving, a particular merchant, and executed product determination module 322 may obtain a merchant name 323

(e.g., "Lex's Home Improvement") from merchant data 312, and based on merchant name 323, executed product determination module 322 may determine the availability of the candidate financial product to fund purchases involving the particular merchant (e.g., "Lex's Home Improvement").

As illustrated in FIG. 3, executed product determination module 322 may provide candidate financial product data 324, which characterizes the one or more available candidate financial products, as an input to a qualification module 326 of executed conversion engine 148. Executed qualification module 326 may, for example, receive candidate financial product data 324, and may perform further operations that access customer data 306 within decomposed field data 304 and obtain a customer identifier 327 associated with user 101, such as, but not limited to, the alphanumeric customer identifier assigned to user 101 by merchant computing system 110 and uniquely identifying user 101 at merchant computing system 110 (e.g., alphanumeric customer identifier "1234," as described herein). Based on customer identifier 327, executed qualification module 326 may obtain, from customer data store 140, elements of profile data 140A, account data 140B, and transaction data 140C that include, or reference, customer identifier 327 and as such, are associated with user 101. Executed qualification module 326 may also perform operations that, based on customer identifier 327, obtain additional data that characterizes user 101, a user of one or more financial services accounts held by user 101, or the interactions between user 101 and the financial institution, such as, but not limited to, elements of reporting or credit-bureau data associated with user 101 and maintained within third-party data 140D.

In some instances, and based on the elements of candidate financial product data 324, executed qualification module 326 may perform additional operations that, for each of the identified candidate financial products, apply corresponding ones of the internal qualification or underwriting criteria to the elements of profile data 140A, account data 140B, and transaction data 140C associated with user 101, and to the elements of reporting or credit-bureau data associated with user 101 and maintained within third-party data 140D, and that generate a corresponding set candidate terms and conditions for each of the identified candidate financial products (e.g., to "pre-approve" user 101 for each of the identified candidate financial products). Based on the candidate terms and conditions, executed qualification module 326 may select one of the identified candidate financial products, and may package portions of candidate financial product data 324 that identify and characterize the selected financial product (e.g., product name, a unique alphanumeric identifier of the selected financial product, etc.), and information identifying the terms and conditions associated with the selected financial product, into corresponding portions of selected product data 328.

For example, the elements of candidate financial product data 324 may identify, and characterize, a loan product, such as an installment loan, that is available for provisioning to user 101 and that is appropriate to fund the $5,500.00 real-time payment requested by "Lex's Home Improvement" on Sep. 1, 2022. In some instances, based on an application of the internal qualification or underwriting criteria associated with the installment loan to the elements of profile data 140A, account data 140B, transaction data 140C, and reporting or credit-bureau data associated with user 101, executed qualification module 326 may determine that user 101 is associated with a credit score above a threshold value and that checking account held by user 101 experiences a positive cash flow on a month-over-month basis (e.g., as specified by the associated internal qualification or underwriting criteria), and may establish terms and conditions for the installment loan that include, but are not limited to, a term of one year, a zero-percent interest rate, and a monthly payment of $458.34 during each month of the one-year term. In some instances, executed qualification module 326 may perform operations that package the elements of candidate financial product data 324 that identify and characterize the available installment loan, and information identifying the terms and conditions, into portions of selected product data 328.

Further, in some instances, executed qualification module 326 may also perform operations that compare the determined terms and conditions of the selected financial product (e.g., the one-year, interest-free installment loan described herein) against corresponding terms or conditions of the payment instrument selected by user 101 to fund the requested payment. For example, executed qualification module 326 may obtain the account number of the payment instrument selected by user 101 to fund the requested payment (e.g., the account number "XXXX-1234-5678-9012"), and based on portions of account data 140B associated with user 101, executed qualification module 326 may determine that the selected payment instrument represents a credit-card account associated with a 7.75% annual percentage rate (APR) and a current monthly payment of $1,275.00. Based on the terms and conditions of the selected payment instrument (e.g., the 7.75% APR and the current monthly payment of $1,275.00), executed qualification module 326 may determine that the one-year, interest-free installment loan represents a more advantageous mechanism for funding the $5,500.00 real-time payment requested by "Lex's Home Improvement," and based on the determination, executed qualification module 326 may perform operations that package the elements of candidate financial product data 324 that identify and characterize the available installment loan, and information identifying the terms and conditions, into the portions of selected product data 328.

Executed qualification module 326 may provide selected product data 328 as an input to an offer generation module 330 of executed conversion engine 148. As illustrated in FIG. 3, executed offer generation module 330 may package customer identifier 327 and selected product data 328, which includes the elements of candidate financial product data 324 that identify and characterize the available installment loan, and the information identifying the terms and conditions, into corresponding portions of offer data 332, which executed conversion engine 148 may provide as an input to notification engine 150. Upon execution by the one or more processors of FI computing system 130, executed notification engine 150 may perform any of the exemplary processes described herein to generate elements of notification data that identify, and characterize, the $5,500.00 real-time payment requested from user 101 by merchant 111 on Sep. 1, 2022, and the one-year, interest-free installment loan available to fund the requested, $5,500.00 real-time payment (e.g., as an alternative to the payment instrument selected by user 101 and characterized the elements of payment data 224 encoded by QR code 220). As described herein, when provisioned to client device 102, and when rendered for presentation within a corresponding digital interface (e.g., via display unit 109A), the elements of notification data may offer the one-year, interest-free installment loan to user 101 as an alternative to funding the requested, $5,500.00 real-time payment via the payment instrument selected by user 101, and that prompt user 101 to indicate an acceptance of the offered the one-year, interest-free installment loan based on an approval of a real-time payment to the financial institution of a nominal amount, e.g., a $1.00 real-time payment funded by the selected payment instrument.

Figure 4A:
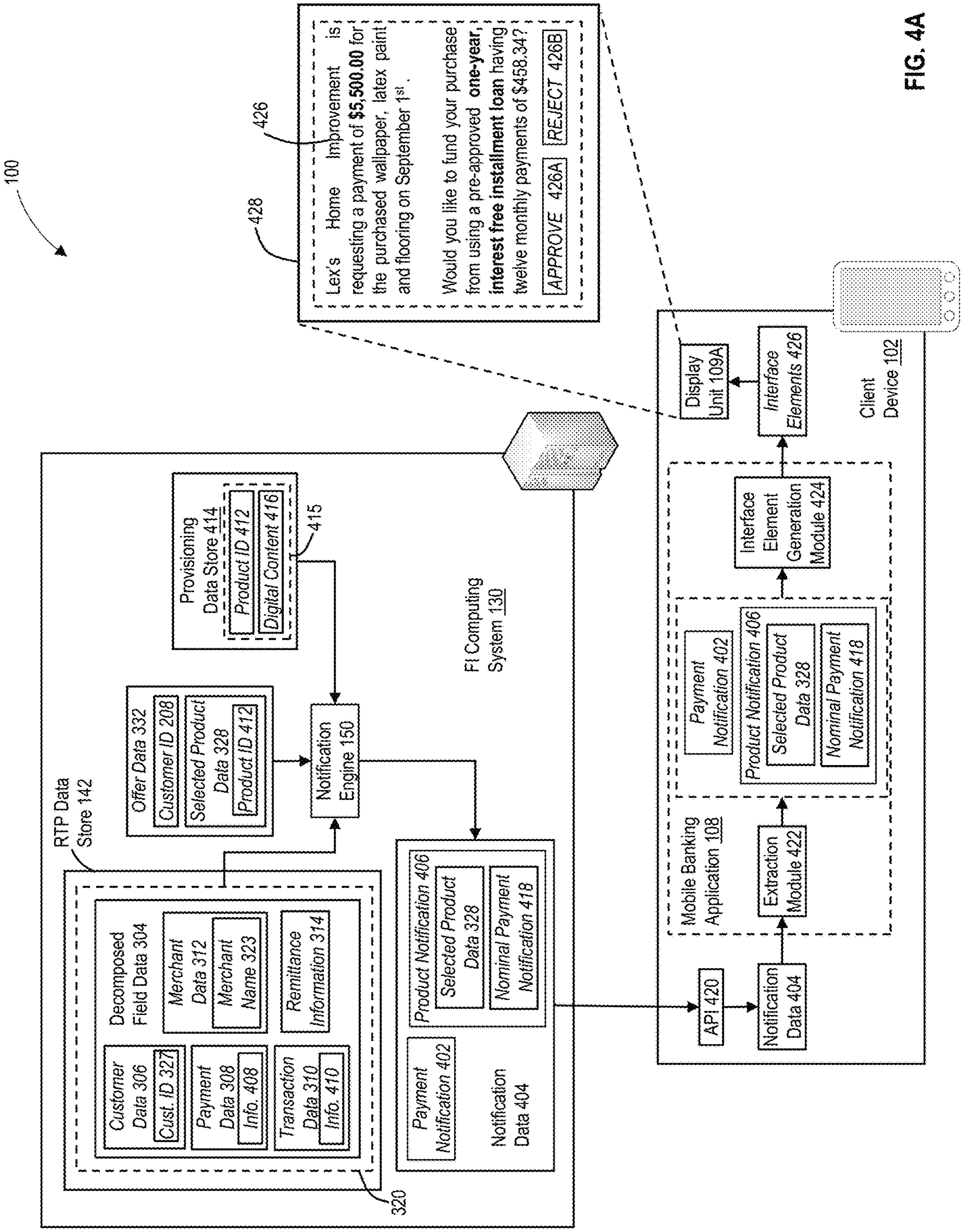

Referring to FIG. 4A, executed notification engine 150 may receive offer data 332, which includes customer identifier 327 and selected product data 328, and executed notification engine 150 may store offer data 332 (includes customer identifier 327 and selected product data 328) within the one or more tangible, non-transitory memories of FI computing system 130, e.g., within a portion of data repository 134. Executed notification engine 150 may also perform operations that, based on customer identifier 327, access elements 320 of RTP data store 142 and obtain decomposed field data 304. As described herein, decomposed field data 304 may include one or more elements of customer data 306, payment data 308, transaction data 310, merchant data 312, and remittance information 314 extracted from the structured or unstructured message fields of RFP message 238 and, as such, that identify and characterize $5,500.00 payment requested from user 101 by merchant 111 (e.g., "Lex's Home Improvement") to fund the purchase of the wallpaper, latex paint, and hardwood flooring on Sep. 1, 2022.

In some instances, and based on portions of decomposed field data 304, executed notification engine 150 may perform operations that generate a payment notification 402 associated with the requested, $5,500.00 real-time payment and that package payment notification 402 into a corresponding portion of notification data 404. For example, executed notification engine 150 may parse payment data 308 to obtain payment information 408 that identifies the requested payment date of Sep. 1, 2022 (e.g., obtained from message field 240 of RFP message 238) and the payment instrument selected by user 101 to fund the purchase transaction (e.g., the account number "XXXX-1234-5678-9012" obtained from message field 246 of RFP message 238). Executed notification engine 150 may also parse transaction data 310 to obtain transaction information 410 that identifies the payment amount of the requested, $5,500.00 real-time payment and payment currency in US dollars (e.g., obtained from message fields 242 of RFP message 238), and may parse merchant data 312 to obtain a name 323 of merchant 111 (e.g., a merchant name "Lex's Home Improvement" obtained from one or message fields 248 of RFP message 238). In some examples, executed notification engine 150 may perform operations that package all, or selected portion of, each of customer identifier 327, information 408 and 410, and merchant name 323 into corresponding portions of payment notification 402, which may be incorporated within notification data 404.

Further, executed notification engine 150 may parse offer data 332 and obtained the elements of selected product data 328, which includes the elements of candidate financial product data 324 that identify and characterize the available installment loan, and the information identifying the terms and conditions (e.g., the one-year term, the $5,500.00 loan amount, the zero-percent interest rate, and the monthly payment of $458.34, etc.), and executed notification engine 150 may package each, or a selected portion, of the elements of selected product data 328 into a product notification 406. Further, executed notification engine 150 may also obtain, from the elements of selected product data 328, a product identifier 412 associated with the available installment loan (e.g., a product name, an alphanumeric identifier assigned to the available installment loan by FI computing system 130, etc.), and may access structured or unstructured data records of a provisioning data store 414 maintained within the one or more tangible, non-transitory memories of FI computing system 130.

In some instances, executed notification engine 150 may parse the structured or unstructured data records of provisioning data store 414 and identify one or more data records, such as data record 415, that includes or references product identifier 412 and as such, that is associated with the available installment loan. Data record 415 may include one or more elements of digital content 416 that, when rendered for presentation within a digital interface by client device 102, offers the pre-approved installment loan to user 101 in accordance with the terms and conditions, and prompts user 101 to accept, or alternatively, decline, the offer to fund the requested, $5,500 real-time payment using the pre-approved installment loan based on, among other things, an approval, or alternatively, a rejection, of a nominal, real-time payment (e.g., in an amount of $1.00) requested from user 101 by the financial institution.

Executed notification engine 150 may obtain the one or more elements of digital content 416 from data record 415, and based on the one or more elements of digital content 416 and on the elements of payment information 408 that identify payment instrument selected by user 101 to fund the purchase transaction, executed notification engine 150 may generate a nominal payment notification 418 that, when rendered for presentation within a corresponding digital interface by client device 102 in conjunction with product notification 406 (e.g., via display unit 109A of client device 102), prompts user 101 to accept the offered installment loan (e.g., in accordance with the determined terms and conditions) by providing input to client device 102 (e.g., via input unit 109B of client device 102) that approves the nominal, real-time payment (e.g., in the amount of $1.00, etc.) requested by the financial institution and funded by the selected payment instrument. In some instances, executed notification engine 150 may package nominal payment notification 418 into a corresponding portion of product notification 406, e.g., in associated with selected product data 328. Executed notification engine 150 may also perform operations that package product notification 406, including the elements of selected product data 328 and nominal payment notification 418, into a corresponding portion of notification data 404, and that cause FI computing system 130 to transmit notification data 404 across communications network 120 to client device 102.

In some instances, data record 415 may include one or more elements of digital content 416 associated with the available installment loan, and the one or more elements of digital content 416 may specify, among other things, that user 101 indicates an acceptance of the offered, one-year, interest-free installment loan as an alternative to funding the requested, $5,500.00 real-time payment via the selected payment instrument by approving a real-time payment of a nominal amount (e.g., $1.00, etc.) from the selected payment instrument to the financial institution. A programmatic interface associated with one or more application programs executed at client device 102, such as an application programming interface (API) 420 associated with mobile banking application 108, may receive notification data 404 and may perform operations that cause client device 102 to executed mobile banking application 108 (e.g., through a generation of a programmatic command, etc.). Upon execution by the one or more processors of client device 102, executed mobile banking application 108 may receive notification data 404 from API 420, and a extraction module 422 of executed mobile banking application 108 may parse notification data 404 to obtain one or more of payment notification 402 and product notification 406, which includes selected product data 328 (e.g., identifying the available installment loan and the determined terms and conditions) and nominal payment notification 418 associated with product notification 406 (e.g., prompting user 101 to accept the offered installment loan by approving the real-time payment of the nominal amount from the selected payment instrument to the financial institution).

In some instances, extraction module 422 may provide payment notification 402, product notification 406 (including selected product data 328 that identifies the available installment loan and the determined terms and conditions and nominal payment notification 418) as inputs to an interface element generation module 424 of executed mobile banking application 108, which may perform operations that generate and route interface elements 426 to display unit 109A. In some instances, when rendered for presentation within a corresponding notification interface 428 by display unit 109A, interface elements 426 provide a graphical representation of the $5,500.00 real-time payment requested by merchant 111 (e.g., "Lex's Home Improvement") for the purchased wallpaper, latex paint, and hardwood flooring and the one-year, interest-free installment loan offered by the financial institution to fund the requested payment to merchant 111 (e.g., as an alternative the funding account selected by user 101). Further, when rendered for presentation within notification interface 428 by display unit 109A, interface elements 426 also prompt user 101 to accept, or decline, the offered installment loan in accordance with the determined terms and conditions by providing further input to client device 102 that approves, or rejects, the nominal, real-time payment requested by the financial institution, e.g., by providing input to input unit 109B that selects a respective one of an "APPROVE" icon 426A and a "REJECT" icon 426B presented within notification interface 428.

Figure 4B:
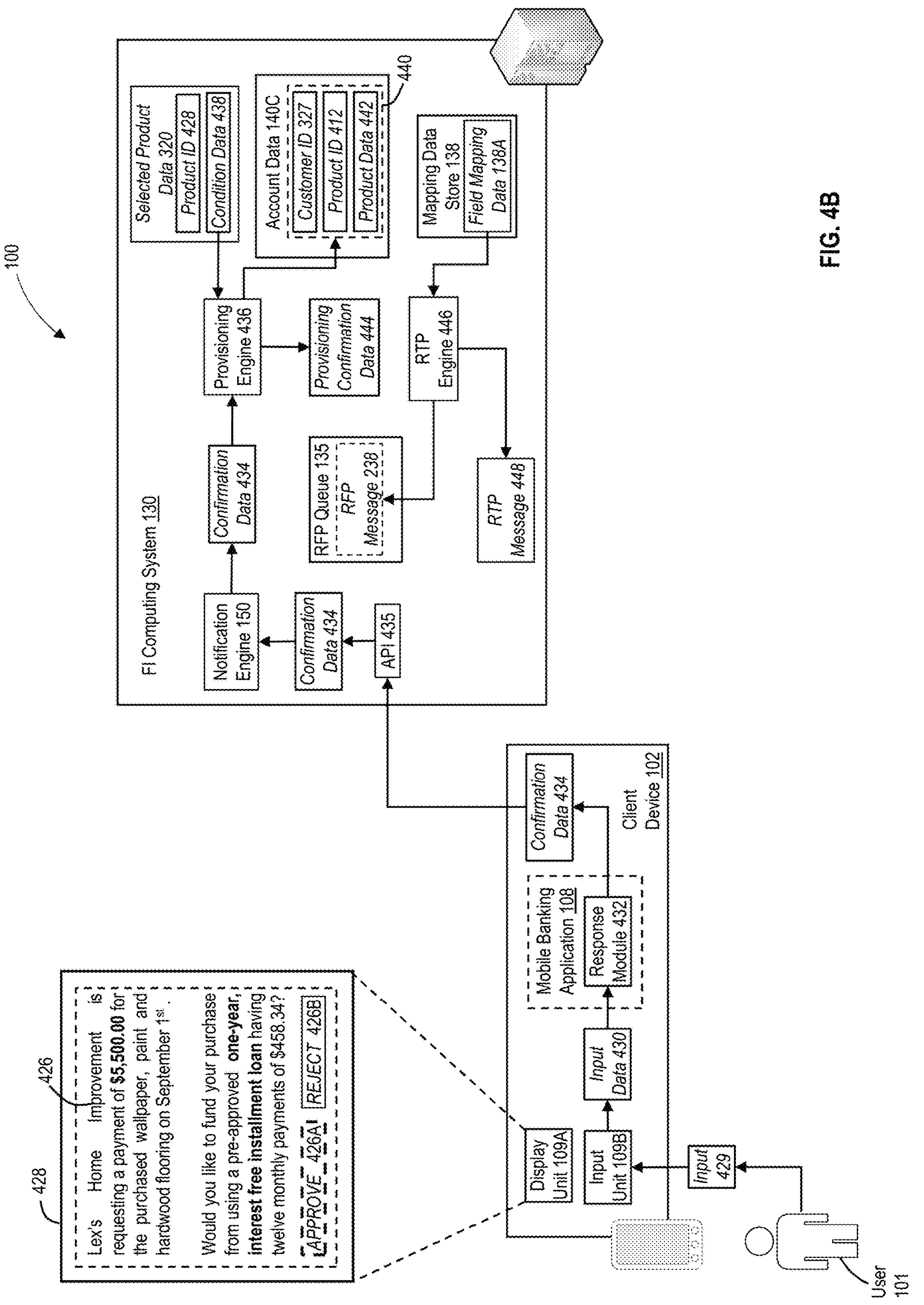

In some instances, user 101 may elect to accept the offered installment loan in accordance with the corresponding terms and conditions (e.g., the one-year term, the $5,500.00 loan amount, the zero-percent interest rate, and the monthly payment of $458.34, etc.) and to fund the $5,500.00 payment requested by merchant 111 using funds provided by the installment loan. Referring to FIG. 4B, user 101 may provide input 429 to client device 102 (e.g., via input unit 109B) that selects "APPROVE" icon 426A, and as such, approves the real-time payment in the nominal amount (e.g., $1.00, etc.) requested by the financial institution and funded by the funding account selected by user 101. Input unit 109B may receive input 429, and may route input data 430 indicative of the selection of "APPROVE" icon 426A by user 101, and the approval of the real-time payment requested by the financial institution, to a response module 432 of executed mobile banking application 108, which may perform operations that process input data 430 and generate one or more elements of data, e.g., confirmation data 434, that confirms the acceptance by user 101 of the offered installment loan in accordance with the corresponding terms and conditions (e.g., the one-year term, the $5,500.00 loan amount, the zero-percent interest rate, and the monthly payment of $458.34, etc.) and the approval by user 101 of the real-time payment in the nominal amount (e.g., $1.00, etc.) requested by the financial institution. Executed response module 432 may perform operations that cause client device 102 to transmit the elements of confirmation data 434 across communications network 120 to FI computing system 130.

A programmatic interface established and maintained by FI computing system 130, such as an application programming interface (API) 435 associated with executed notification engine 150, may receive the elements of confirmation data 434 and may route the elements of confirmation data 434 to executed notification engine 150, which may store the elements of confirmation data 434 within the one or more tangible, non-transitory memories of FI computing system 130, e.g., within a portion of data repository 134. Further, in some instances, executed notification engine 150 may also provide the elements of confirmation data 434 as input to a provisioning engine 436 that, when executed by the one or more processors of FI computing system 130, may perform operations that complete one or more internal qualification or underwriting processes (e.g., initiated by executed qualification module 326 of FIG. 3), and provision the offered installment loan to user 101 in accordance with the determined terms and conditions. For example, as illustrated in FIG. 4B, executed provisioning engine 436 may access the elements of selected product data 328 maintained within the one or more tangible, non-transitory memories of FI computing system 130 (e.g., within data repository 134), and may obtain, from the elements of selected product data 328, product identifier 412 associated with the offered, and now-accepted installment loan and condition data 438 that identifies and characterizes the terms and conditions of the now-accepted installment loan. As described herein the terms and conditions may include, but are not limited to, the one-year loan term, the $5,500.00 loan amount, the zero-percent interest rate, and the monthly payment of $458.34.

In some instances, executed provisioning engine 436 may perform operations that access the structured or unstructured data records of account data 140B associated with user 101 (e.g., that include or reference customer identifier 327 of user 101), and perform operations that generate an additional data record 440 associated with the installment loan provisioned to user 101 to fund the $5,500.00 real-time payment requested from user 101 by merchant 111 on Sep. 1, 2022. For example, data record 440 may include customer identifier 327 of user 101 and product identifier 412 of the provisioned installment loan. Further, and based on condition data 438, executed provisioning engine 436 may generate elements of product data 442 that identify the terms and conditions of the installment loan provisioned to user 101 (e.g., the one-year loan term, the $5,500.00 loan amount, the zero-percent interest rate, and the monthly payment of $458.34, etc.), and that include information characterizing a current, outstanding balance of $5,500.00 for the provisioned installment loan and an outstanding monthly payment of $458.34 due on a corresponding due date. Executed provisioning engine 436 may perform operations that store the elements of product data 442 within a corresponding portion of data record 440, e.g., in associated with customer identifier 327 and product identifier 412. Further, although not illustrated in FIG. 4B, executed provisioning engine 436 may access one or more of the structured or unstructured data records of account data 140B associated with payment instrument selected by user 101 to fund the requested, $5,500.00 real-time payment (e.g., the funding account described herein), and perform any of the exemplary processes described herein to debit the nominal amount of the real-time payment (e.g., $1.00, etc.) requested by the financial institution and approved by user 101, e.g., to indicate the acceptance of the installment loan by user 101.

Executed provisioning engine 436 may also generate one or more elements of data, e.g., provisioning confirmation data 444, that confirm the successful provisioning of the $5,500.00 installment loan to user 101 in accordance with the terms and conditions, and may route the generated elements of provisioning confirmation data 444 to a real-time payment (RTP) engine 446 that is executable by the one or more processors of FI computing system 130. In some instances, and upon execution by the one or more processors of FI computing system 130 (e.g., based on a programmatic signal generated by executed provisioning engine 436, etc.), executed RTP engine 446 may process the elements of provisioning confirmation data 444, and perform operations that debit the $5,500.00 from an account associated with the provisioned installment loan (e.g., by augmenting or modifying the elements of product data 442 maintained with data record 440 of account data 140B), and credit the $5,500.00 to the financial services account associated with merchant 111.

By way of example, executed RTP engine 446 may perform operations that access data record 440 of account data 140B, and perform operations that augment or modify portions of product data 442 to debit the $5,500.00 payment for the purchased wallpaper, latex paint, and hardwood flooring from the account associated with the provisioned installment loan. Executed RTP engine 446 may also perform operations that generate an additional real-time payment (RTP) message 448 that transfers the $5,500.00 in funds debited from the account associated with the provisioned installment loan to the financial services account associated with merchant 111 (e.g., the tokenized account number "XXX-9012-3456-7890," as specified within message field 250 of RFP message 238). As described herein, RTP message 448 may include discrete elements of message data characterizing the financial institution associated with FI computing system 130, merchant 111, the transfer amount of $5,500.00, the account associated with the provisioned installment loan (e.g., that funds the transfer), and the financial services account of merchant 111 (e.g., that receives the proceeds of the transfer), and the elements of message data may populate one or more data fields structured or formatted in accordance with the ISO 20022 standard for electronic data exchange (e.g., as specified within field mapping data 138A, etc.).

Executed RTP engine 446 may also perform operations that cause FI computing system 130 to broadcast RTP message 448 directly across communications network 120 to one or more of intermediate computing systems associated with the RTP processing network, such as, but not limited to, the clearinghouse system associated with the RTP processing network, as described herein. In some instances, and prior to broadcasting RTP message 448 across communications network 120, executed RTP engine 446 may perform operations that encrypt RTP message 448 using a corresponding encryption key. Further, executed RTP engine 446 may also perform operations that access RFP message 238 maintained within RFP queue 135, and delete RFP message 238 from RFP queue 135, e.g., based on the provisioning of the installment loan to user 101 and on the founding of the $5,500.00 real-time payment requested by merchant 111 using funds from the provisioned installment loan.

Although not illustrated in FIG. 4B, the clearinghouse system may receive RTP message 448, and the clearinghouse system may, for example, parse RTP message 448 to access, within a corresponding one of the message fields, tokenized account data associated with the financial merchant account associated with merchant 111, and based on the tokenized account data, the clearinghouse system may identify the financial institution of merchant 111. The financial institution of merchant 111 may, for example, represent a participant in the RTP processing network, and the clearinghouse system may perform operations that obtain a network address associated with a computing system of the financial institution of merchant 111 (e.g., a "merchant FI computing system"), and the clearinghouse system may route RTP message 448 across communications network 120 to the merchant FI computing system based on the obtained network address.

In some instances, the merchant FI computing system may receive RTP message 448, and based on the data populating the message fields of RTP message 448, the merchant FI computing system may perform operations that credit the account of merchant 111 with the $5,500.00 in real-time and contemporaneously with the initiation of the purchase of the wallpaper, latex paint, and hardwood flooring by user 101, and that route RTP message 448 across communications network 120 to merchant computing system 110, e.g., as a message confirming an execution of the requested, real-time payment using funds from the provisioned installment loan (not illustrated in FIG. 4B). Further, and as described herein, one or more portions of RTP message 448 may be encrypted (e.g., using an encryption key, as described herein), and the merchant FI computing system may perform operations that access a corresponding decryption key maintained within one or more tangible, non-transitory memories, and that decrypt the encrypted portions of RTP message 448 using the corresponding decryption key.

Figure 4C:
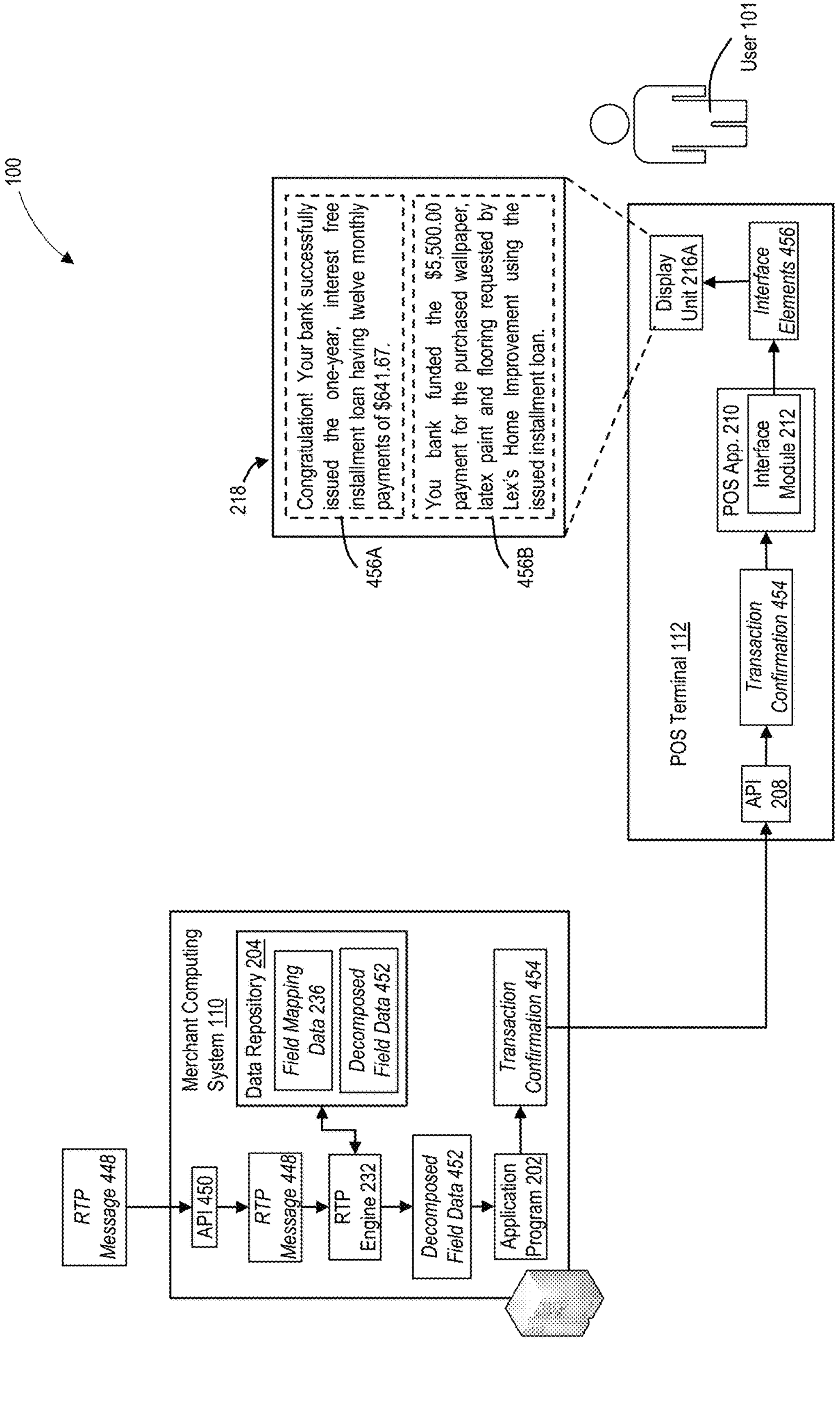

Referring to FIG. 4C, a programmatic interface established and maintained by merchant computing system 110, such as an application programming interface (API) 450 associated with executed RTP engine 232, may receive RTP message 448 (e.g., across communications network 120 from FI computing system 130, either directly or indirectly via the clearinghouse system or the merchant FI computing system) and route RTP message 448 to executed RTP engine 232. In some instances, one or more portions of RTP message 448 may be encrypted (e.g., using an encryption key, as described herein), and the merchant FI computing system may perform operations that access a corresponding decryption key maintained within one or more tangible, non-transitory memories, and that decrypt the encrypted portions of RTP message 448 using the corresponding decryption key.

Executed RTP engine 232 may, for example, perform operations that access field mapping data 236 maintained within data repository 204, and based on the obtained elements of field mapping data 236, executed RTP engine 232 may perform operations that parse RTP message 448 and obtain elements of decomposed field data 452 that confirm a successful execution of the $5,500.00 real-time payment requested by merchant 111 for the purchase of the wallpaper, latex paint, and hardwood flooring initiated by user 101 on Sep. 1, 2022. Executed RTP engine 232 may store the elements of decomposed field data 452 within a portion of the one or more tangible, non-transitory memories of merchant computing system 110 (e.g., within a portion of data repository 204), and provide decomposed field data 452 as an input to executed application program 202, which may perform operations that generate elements of data, e.g., a transaction confirmation 454, that confirm the provisioning of the one-year, interest-free installment loan to user 101 and the funding of the requested, $5,500.00 real-time payment using funds associated with the now-provisioned installment loan. Executed application program 202 may perform operations that cause merchant computing system 110 to transmit all, or a selected portion, of the elements of transaction confirmation 454 to POS terminal 112, e.g., across wired or wireless communications channel 116.

In some instances, a programmatic interface established and maintained by POS terminal 112, such API 208, may receive transaction confirmation 454, and may route transaction confirmation 454 to executed POS application 210. For example, interface module 212 of executed POS application 210 may receive transaction confirmation 454, and may process transaction confirmation 454 and generate one or more interface elements 456 that, when presented to user 101 by display unit 216A of POS terminal 112, provide a graphical representation that confirms, to user 101, the provisioning of the one-year, interest-free installment loan and the funding of the requested, $5,500.00 real-time payment using funds associated with the now-provisioned installment loan. As illustrated in FIG. 4C, executed interface module 212 may provide interface elements 456 as an input to display unit 216A of POS terminal 112, and display unit 216A may perform operations that render all, or a selected subset of, interface elements 456 for presentation to user 101 within a corresponding digital interface, such as digital interface 218. By way of example, digital interface 218 may include interface elements 456A, which confirm the provisioning of the one-year, interest-free installment loan to user 101, and interface elements 456B, which confirm the funding of the requested, $5,500.00 real-time payment using funds associated with the now-provisioned installment loan and the execution of the initiated purchase of the wallpaper, the latex paint, and the hardwood flooring from merchant 111. Further, merchant computing system 110 may perform operations that enable merchant 111 to provision the purchased wallpaper, latex paint, and hardwood flooring to user 101.

In some instances, merchant computing system 110 and POS terminal 112 may perform one or more of the exemplary processes described herein to present interface elements 456A and 456B, which confirm respective ones of the confirm the provisioning of the one-year, interest-free installment loan and the funding of the requested, $5,500.00 real-time payment using funds associated with the now-provisioned installment loan, to user 101 via digital interface 218 contemporaneously with not only the initiated purchase of the wallpaper, the latex paint, and the hardwood flooring from merchant 111, but also contemporaneously with the request to fund the initiated purchase transaction with a real-time payment and the provisioning of QR code 220 to optical scanner device 216B of POS terminal 112. Further, and through a performance of one or more of the exemplary processes described herein, FI computing system 130 may perform operations that "convert" the real-time payment requested by merchant 111 on Sep. 1, 2022, for the purchased wallpaper, latex paint, and hardwood flooring (e.g., as specified within the message fields of RFP message 238) into a corresponding, targeted financing offer, which may fund the requested, real-time payment and be provisioned to user 101 in real-time and contemporaneously with the initiation of the corresponding purchase transaction, e.g., while user 101 is deposed proximate to a location of POS terminal 112.

Figure 4D:
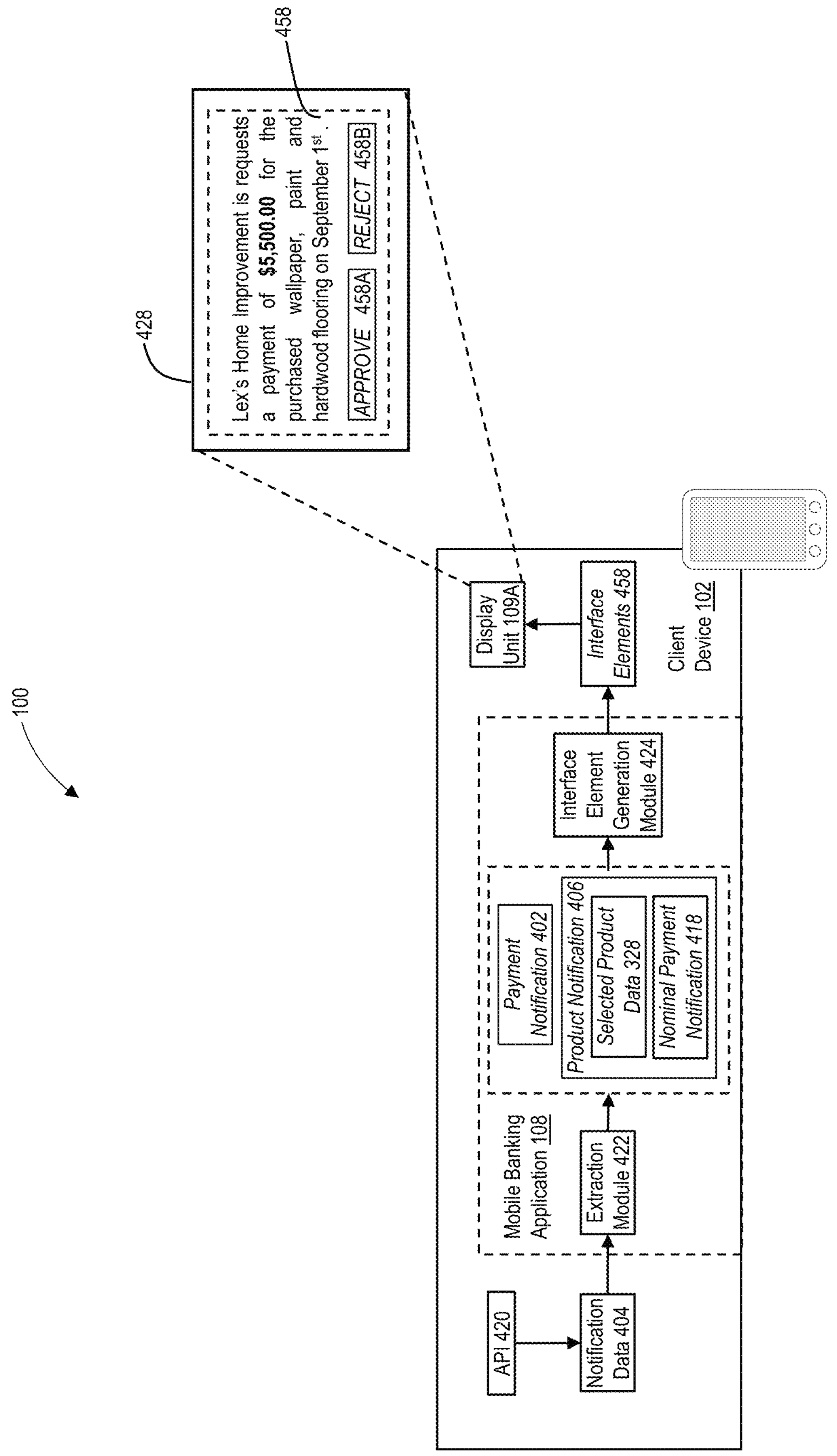

As described herein, user 101 may elect to accept the offered installment loan in accordance with the determined terms and conditions, and may provide input to client device 102 (e.g., input 429 of FIG. 4B) that selects "Approve" icon 426A within notification interface 428, and that approves the corresponding, real-time payment in the nominal amount requested by the financial institution prior to provisioning the offered installment loan to user 101. In other instances, user 101 may elect to define the offered installment loan and may provide additional input to client device 102 (e.g., via input unit 109B) that selects the "REJECT" icon 426B presented within notification interface 428. Referring to FIG. 4D, and based on the additional input, executed extraction module 422 may route payment notification 402 to executed interface element generation module 424, which may perform operations that generate and route interface elements 458 to display unit 109A. When presented within notification interface 428 by display unit 109A, interface elements 458 may provide a graphical representation of payment notification 402 that prompts user 101 to approve or reject the $5.500.00 payment requested by merchant 111 on Sep. 1, 2022, for the purchased wallpaper, latex paint, and hardwood flooring, e.g., based on additional input provided to input unit 109B of client device 102 that selects a respective one of an "APPROVE" icon 458A and a "REJECT" icon 458B.

User 101 may, for example, elect to approve the $5,500.00 payment requested by merchant 111 for the purchase of the wallpaper, latex paint, and hardwood flooring, and user 101 may provide input to client device 102 (e.g., via input unit 109B) that selected "APPROVE" icon 458A. Based on the input, executed mobile banking application 108 may perform operations (not illustrated in FIG. 4D), that generate and transmit an additional response to notification data 404 that include a payment confirmation indicative of the approved payment across communications network 120 to FI computing system 130, which may perform operations that, in real-time, debit the $5,500.00 from an account held by user 101 and associated with the selected payment instrument (e.g., the funding account described herein( ), and that credit the $5,500.00 to the financial services account associated with merchant 111 and specified within RFP message 238 (e.g., either directly, if the financial institution issues the financial services account associated with merchant 111, or based on additional ISO-20022-compliant RTP messages exchanged with computing systems associated with other financial institution). FI computing system 130 may also perform operations that access RFP message 238 maintained within RFP queue 135, and delete RFP message 238 from RFP queue 135, e.g., based on the approval by user 101 and the real-time clearance and settlement of the approved payment.

Further, FI computing system 130 may also perform operations that transmit one or more messages to merchant computing system 110 that confirm the approval of the requested payment by user 101 and the real-time clearance and settlement of the approved payment, either directly across communications network 120 or through one or more of computing systems associated with participants in the RTP processing network (e.g., additional ISO-20022-compliant messages, etc.). Based on the one or more messages, merchant computing system 110 may perform operations that enable merchant 111 to execute the initiated purchase transaction and provision the purchased couch, coffee table, and entertainment set to user 101.

In other instances, and based on confirmation data indicating a rejection by user 101 of the requested payment (e.g., based on additional input selecting "REJECT" icon 458B), FI computing system 130 may perform operations that delete RFP message 238 from RFP queue 135, and generate and transmit one or more messages to merchant computing system 110 indicative of the rejected payment, either directly across communications network 120 or through one or more of computing systems associated with participants in the RTP ecosystem (e.g., additional ISO-20022-compliant messages, etc.). Based on the indication of the rejection of the requested payment by user 101 (e.g., due to potential fraud, etc.), merchant computing system 110 may perform operations that enable merchant 111 to cancel the initiated purchase transaction in real-time and without delays and chargebacks characteristic of the transaction reconciliation, clearance, and settlement processes involving payment rails and transaction processing-messages.

Figure 5A:
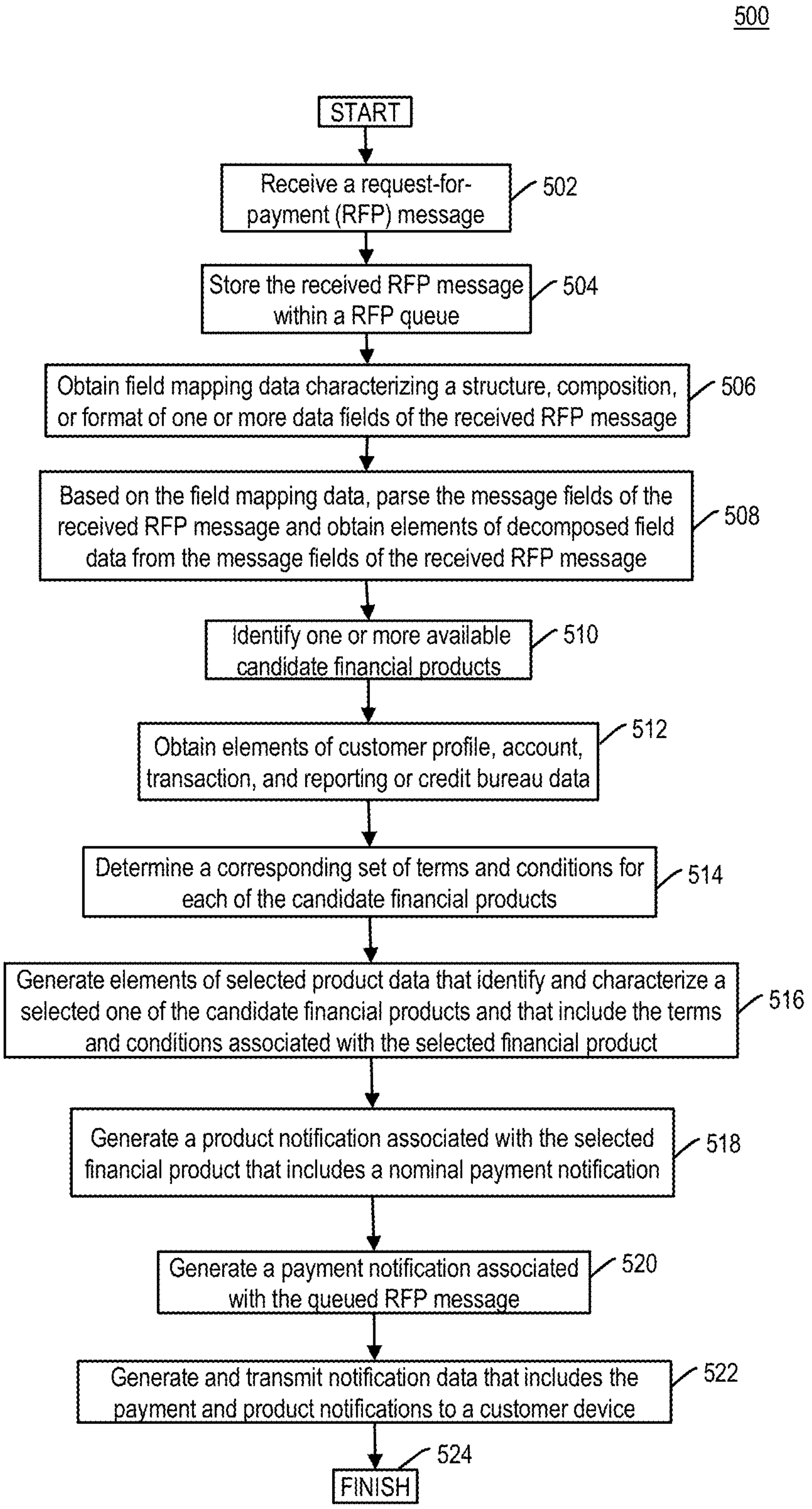
FIGS. 5A, 5B, and 5C are flowcharts of exemplary processes for provisioning, in real-time, targeted product data associated with initiated exchanges of data based on structured messaging data, in accordance with some exemplary embodiments.
Figure 5B:
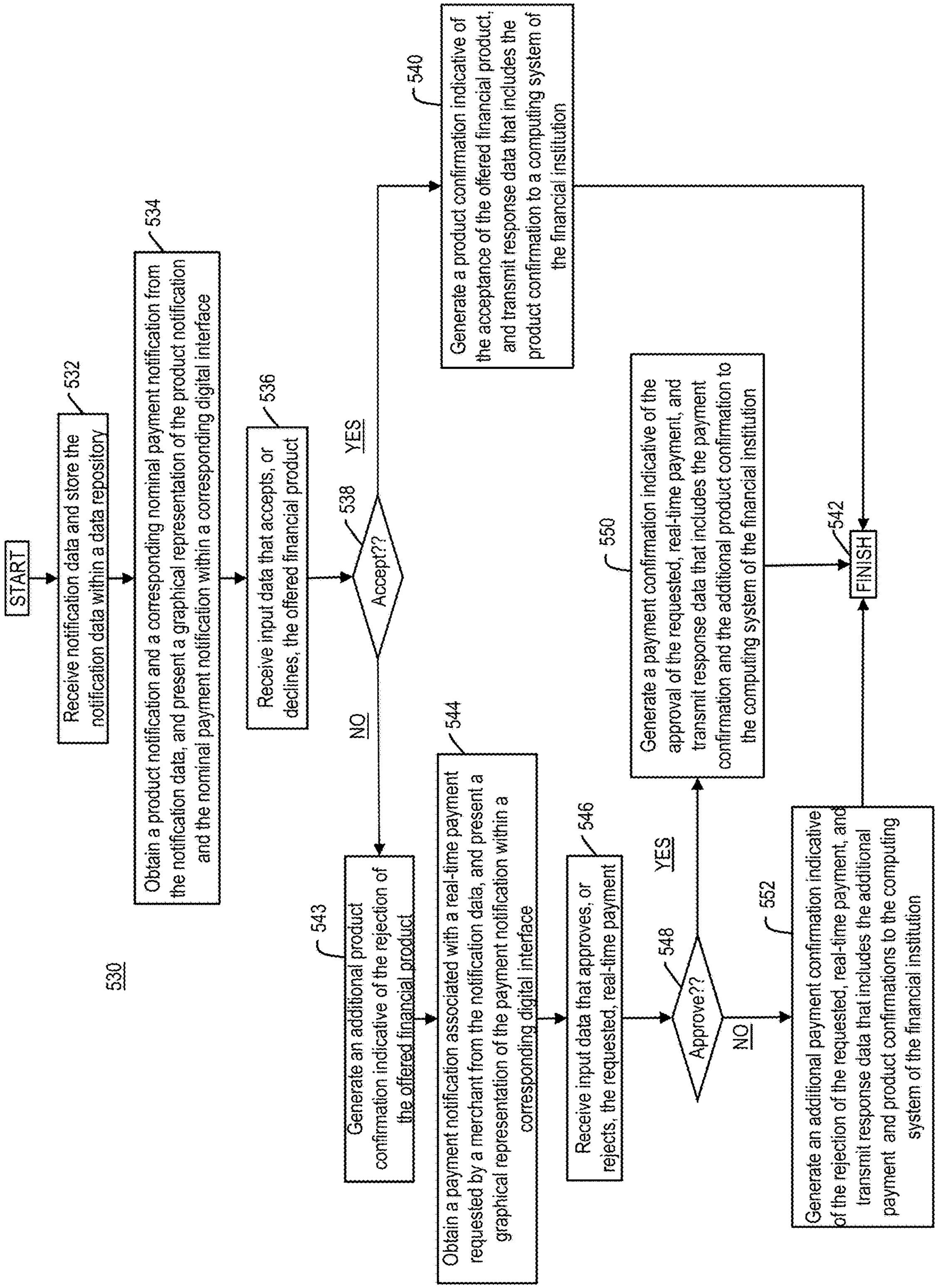
Figure 5C:
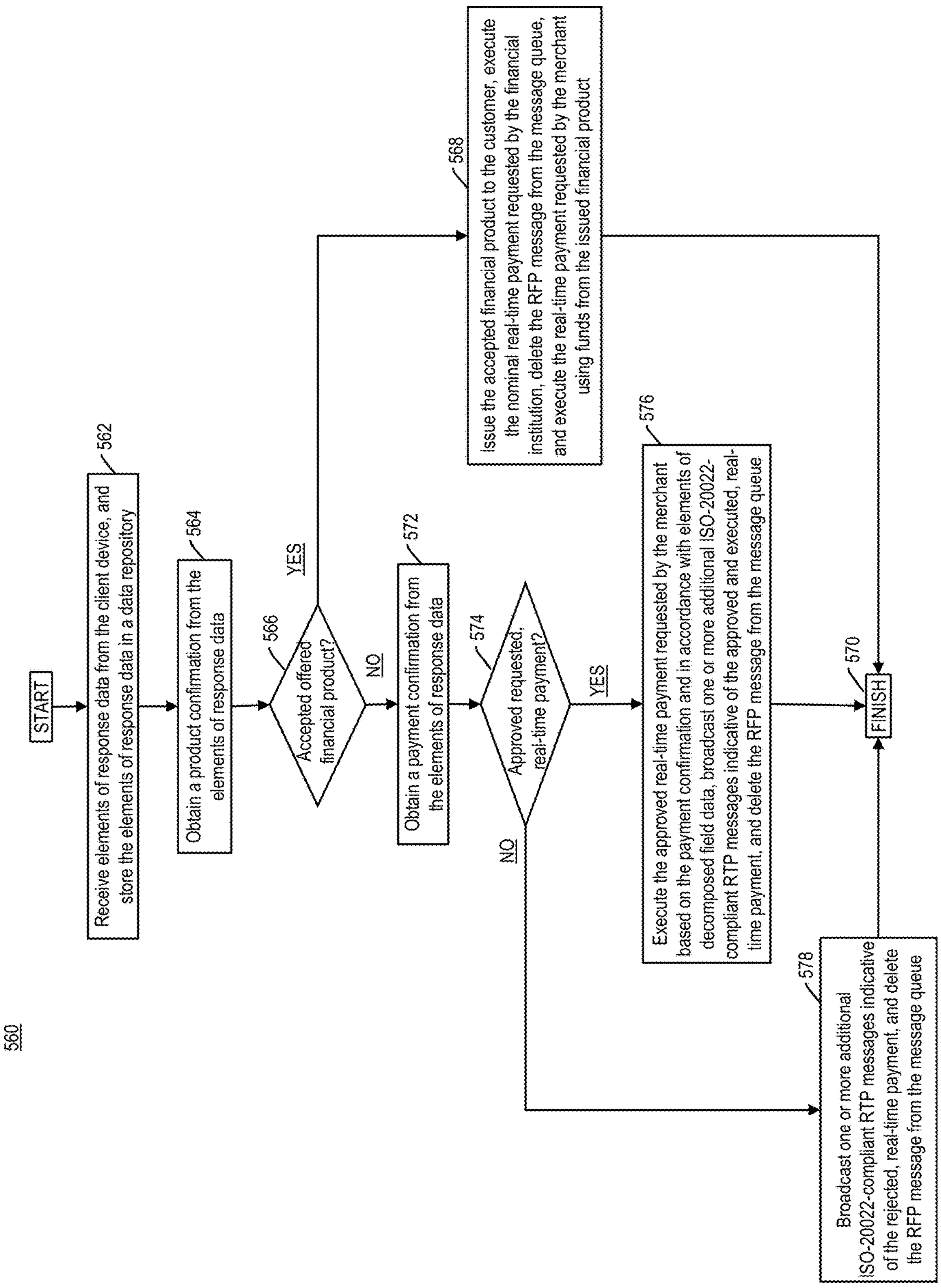

FIGS. 5A, 5B, and 5C are flowcharts of exemplary processes for provisioning, in real-time, targeted product data associated with initiated data exchanges to customer devices based on structured messaging data, in accordance with some exemplary embodiments. For example, one or more computing systems associated with a financial institution, such as FI computing system 130, may perform one or more of the steps of exemplary process 500, as described below in reference to FIG. 5A, and one or more of the steps of exemplary process 560, as described below in reference to FIG. 5C. Further, a computing device associated with, or operable by, user 101, such as client device 102, may perform one or more of the steps of exemplary process 530, as described below in reference to FIG. 5B.

Referring to FIG. 5A, FI computing system 130 may receive an RFP message, such as, but not limited to, RFP message 238 described herein, having message fields structured in accordance with the ISO 20022 standard (e.g., in step 502 of FIG. 5A), and may store the received RFP message within a message queue (e.g., in step 504 of FIG. 5A). In some instances, FI computing system 130 may maintain the received RFP message within the message queue until the customer provides input accepting or rejecting the requested monthly payment, or alternatively, until an expiration of a corresponding period of temporal validity. As described herein, the received RFP message may characterize an exchange of data, such as a purchase transaction, initiated between a first counterparty (e.g., a merchant, such as merchant 111 associated with merchant computing system 110) and a second counterparty (e.g., a customer of the merchant, such as user 101 associated with client device 102), and the purchase transaction may involve, or be associated with one or more products or services provisioned by the first counterparty to the second counterparty.

By way of example, and as described herein, user 101 may elect to purchase one or more products or services from merchant 111, and merchant computing system 110 may perform any of the exemplary processes to generate elements of transaction data that, among other things, includes values of one or more transaction parameters that characterize the purchase of the products or services, such as, but not limited to, identifiers of each of the products or services (e.g., a product or service name, a corresponding Universal Product Code (UPC), etc.), purchased quantities of each of the products or services, unit costs of each of the products or services, and a total transaction amount, a subtotal, and sales taxes or fees applied to the purchase transactions. In some instances, merchant computing system 110 may perform operations that provision all, or a selected portion, of the generated transaction data to a terminal device in communication with merchant computing system 110 across a corresponding wired or wireless channel of communications, such as, but not limited to, POS terminal 112 across wired or wireless communications channel 116. As described herein, POS terminal 112 may be disposed within a physical location of merchant 111.

As described herein, an application program executed by the one or more processors of POS terminal 112, such as POS application 210, may process the elements of transaction data and generate one or more interface elements that, when presented to user 101 by a corresponding display unit within a corresponding digital interface, provide a graphical representation of the products or services purchased from the merchant 111, the unit costs associated with each of the purchased products or services, and aggregate costs associated with the now-initiated purchase transaction, and prompt user 101 to provision payment for the purchased products or services. For example, the corresponding digital interface may include one or more additional interface elements that prompt user 101 to provide input to POS terminal 112 that confirms an intention of user 101 to fund the purchase transaction using a real-time payment debited from a funding account on or before a requested payment date. In some instance, and based on input provided to client device 102 by user 101, the one or more processors of client device 102 may execute mobile banking application 108, and executed mobile banking application may generate a matrix barcode, such as QR code 220, that encodes elements of customer data identifying user 101 and elements of payment data identifying the funding account associated with the real-time payment, such as, but not limited to, the corresponding, exemplary elements of customer or payment data described herein.

Executed mobile banking application 108 cause client device 102 to render QR code 220 within a portion of a corresponding digital interface (e.g., via a display unit 109A of client device 102), and in some instances, user 101 may position client device 102 such that presented matrix barcode is disposed proximate to an input unit, such as optical scanner device (e.g., optical scanning device 216B), incorporated into, or communicatively coupled to, POS terminal 112, and optical scanner device 216B may be configured by the one or more processors of POS terminal 112 to interrogate and scan presented QR code 220 and generate corresponding elements of encoded input data associated with now-scanned QR code 220. As described herein, the elements of encoded input data may confirm the intention of user 101 to fund the purchase transaction using the real-time payment debited from the funding account on or before the requested, payment date, and executed POS application 210 may perform any of the exemplary processes described herein to apply one or more decoding processes appropriate to QR code 220 to the elements of encoded input data, and based on the application of the appropriate decoding processes to the elements of encoded input data generate decoded data that includes, among other things, the elements of customer data and payment data described herein.

POS terminal 112 may also perform operations that provision the elements of decoded data, including the elements of customer data and payment data, to merchant computing system 110, which may perform any of the exemplary processes described herein to generate the RFP message based on the elements of transaction data, the received elements of customer and payment data, and additional elements of merchant data identifying merchant 111. In some instances, FI computing system 130 may receive the RFP message directly from merchant computing system 110 across a corresponding communications network (e.g., communications network 120), or may receive the RFP message from via one or more intermediate computing systems, such as, but not limited to, as a computing system associated with the financial institution of the merchant or one or more computing systems of a clearinghouse associated with the RTP ecosystem.

In other instances, the RFP message may be generated by an intermediate computing system, such as the computing system associated with the financial institution of the merchant or the one or more computing systems of the clearinghouse, based on elements of data characterizing the purchase transaction and generated by merchant computing system 110. By way of example, merchant computing system 110 may provision a payment request that includes all, or a selected portion, of the elements of customer, merchant, payment, and transaction data to the intermediate computing system (e.g., across communications network 120), and the intermediate computing system may perform any of the exemplary processes described herein to obtain the elements of customer, merchant, payment, and transaction data from the payment request and generate the RFP message based on the obtained elements of customer, merchant, payment, and transaction data.

Further, and as described herein, the received RFP message may include message fields consistent with the ISO 20022 standard for electronic data exchange between financial institutions, and each of the message fields may be populated with data structured and formatted in accordance with the ISO 20022 standard. By way of example, the received, ISO-20022-compliant RFP message may include, among other things, (i) message fields populated with data specifying a full name and postal address of user 101; (ii) message fields populated with data identifying a payment instrument selected by user 101 to fund the initiated purchase transaction; (iii) message fields populated with data specifying a name and postal address of the merchant; (iv) message fields populated with data identifying a financial services account held by the merchant and available to receive processed from the requested payment; and (v) message fields populated with one or more parameter values that characterize the purchase transaction, a requested payment method, and/or a requested payment date. The received, ISO-20022-compliant RFP message may also include structured or unstructured message fields that specify additional remittance information associated with the purchase transaction, and examples of the additional remittance information include, but are not limited to, information identifying a product or service involved in the purchase transaction, or a link to remittance data associated with the initiated transaction (e.g., a long-form URL or shortened to a PDF or HTML invoice, as described herein).

Referring back to FIG. 5A, and responsive to the receipt of the RFP message, FI computing system 130 may access mapping data that identifies and characterizes each of the messages fields within the ISO-20022-compliant RFP message (e.g., in step 506 of FIG. 5A). Based on the mapping data, FI computing system 130 may perform any of the exemplary processes described herein to parse and analyze all or a selected subset of the message fields of the RFP message to extract, obtain, or derive discrete elements of data that identify and characterize user 101, merchant 111, the initiated purchase transaction, and the requested, real-time payment (e.g., in step 508 of FIG. 5A). FI computing system 130 may perform additional operations, described herein, that store the extracted, obtained, or derived data elements of decomposed field data (e.g., that identify and characterize user 101, merchant 111, the initiated purchase transaction, and the requested, real-time payment) within an accessible data repository, e.g., within an element of RTP data store 142.

In other instances, also in step 508, FI computing system 130 may perform any to the exemplary processes described herein to detect, within one or more of the message fields, a link to the remittance data associated with the requested monthly payment (e.g., a link to a PDF or HTML invoice or receipt that includes any of the information described herein). By way of example, the link may correspond to a long-form uniform resource locator (URL) into which certain elements of data may be embedded, such as, but not limited to, a unique identifier of the customer, and FI computing system 130 may perform operations, described herein, that parse the long URL to identify and extract the embedded data.

Additionally, or alternatively, FI computing system 130 may perform any of the exemplary processes described herein that, based on the detected link (e.g., the long-form URL described above, or a shortened URL, such as a tiny URL), programmatically access the remittance data associated with the processed link, e.g., as maintained at merchant computing system 110. The remittance data may include a PDF or HTML invoice or bill (e.g., formatted invoice data 252), and the FI computing system may perform operations that process the remittance data (e.g., through an application of an optical character recognition (OCR) process to the PDF invoice or bill, parsing code associated with the HTML invoice or bill, applying a screen-scraping technology to the invoice or bill) to extract the additional or alternate elements of the data that identifies and characterizes user 101, merchant 111, the initiated purchase transaction, and the requested, real-time payment. For instance, and based on the processed remittance data, the FI computing system may obtain elements of transaction data that, among other things, identifies a product or service involved in the initiated purchase transaction (e.g., a UPC, etc.).

In some instances, and based on the elements of decomposed field data associated with the received RFP message and the real-time payment requested from user 101 by merchant 111, FI computing system 130 may perform any of the exemplary processes described herein to identify one or more candidate financial products that are appropriate to fund the real-time payment requested from user 101 by merchant 111 (e.g., in step 510 of FIG. 5A). By way of example, in step 510, FI computing system 130 may perform operations, described herein, that obtain elements of candidate financial product data identifying and characterizing each of the candidate financial products, and specifying one or more internal qualification or underwriting criteria associated with each of the candidate financial products to user 101. Further, FI computing system 130 may also perform operations, described herein, that access one or more elements of customer profile data, account data, and transaction data associated with user 101, and further, that obtain one or more elements of additional data that characterize user 101, one or more financial services accounts held by user 101, or the interactions between user 101 and the financial institution, such as, but not limited to, elements of reporting or credit-bureau data associated with user 101 (e.g., in step 512 of FIG. 5A).

Based on the elements of candidate financial product data, FI computing system 130 may perform any of the exemplary processes described herein to apply the internal qualification or underwriting criteria associated with corresponding ones of the identified candidate financial products to the elements of customer profile data, account data, transaction data, and additional data (e.g., the reporting or credit-bureau data) associated with user 101, and to determine a set candidate terms and conditions for each of the identified candidate financial products (e.g., in step 514 of FIG. 5A). As described herein, the determination of a set of terms and conditions for a corresponding one of the identified candidate financial products may, in some instances, "pre-approve" user 101 for a subsequent issuance or provisioning of the corresponding one of the identified candidate financial products. Further, and based on the candidate terms and conditions, FI computing system 130 may perform any of the exemplary processes described herein to select one of the identified candidate financial products (e.g., as a targeted financial offer for the requested, real-time payment), and to package portions of the candidate financial product data that identify and characterize the selected financial product, and information identifying the term and conditions associated with the selected financial product, into corresponding portions of selected product data (e.g., in step 516 of FIG. 5A).

By way of example, the candidate financial product data may identify, and characterize, a loan product, such as an installment loan, that is available for provisioning to user 101 and that is appropriate to fund the $5,500.00 real-time payment requested by merchant 111 on Sep. 1, 2022. In some instances, based on an application of the internal qualification or underwriting criteria associated with the installment loan to the elements of profile data, account data, transaction data, and reporting or credit-bureau data associated with user 101, FI computing system 130 may perform any of the exemplary processes described herein to "pre-approve" user 101 for the installment loan based on determined terms and conditions that include, but are not limited to, a term of one year, a zero-percent interest rate, and a monthly payment of $458.34 during each month of the one-year term. Further, FI computing system 130 may also perform any of the exemplary processes described herein to select the pre-approved installment loan as the targeted financing offer for the $5,500.00 real-time payment requested by merchant 111 on Sep. 1, 2022, and to package, into corresponding portions of the selected product data, portions of the candidate financial product data that identify and characterize the selected installment loan, and information identifying the determined term and conditions associated with the selected installment loan.

Referring back to FIG. 5A, FI computing system 130 may also perform any of the exemplary processes described herein to generate a product notification associated with the selected financial product, such as, but not limited to, the one-year, interest-free installment loan pre-approved for provisioning to user 101 (e.g., in step 518 of FIG. 5A). For example, the generated product notification may include portions of the selected product data that identify and characterize the selected financial product (e.g., the one-year, interest-free installment loan) and further, that specify the determined terms and conditions of that selected financial product (e.g., the one-year term, the zero-percent interest rate, the corresponding loan amount, and the corresponding monthly payment, etc.). The generated product notification may also include a nominal payment notification that, when presented on a digital interface generated by an application program executed at client device 102 (e.g., mobile banking application 108 of FIG. 1, etc.), prompt user 101 to accept, or alternatively, decline, an offer to fund the requested, real-time payment using the selected financial product (e.g., the one-year, interest-free installment loan) in accordance with the determined terms and conditions by providing, to client device 102, input that approves a nominal, real-time payment requested by the financial institution, such as, but not limited to, e.g., a $1.00 real-time payment.

Further, FI computing system 130 may perform any of the exemplary processes described herein to generate one or more elements of a payment notification associated with the queued RFP message, and the real-time payment requested by merchant 111, based on all, or a selected portion, of the decomposed field data (e.g., in step 520 of FIG. 5A). By way of example, and as described herein, the payment notification may include, among other things, the full name of user 101, the requested payment amount and payment date, information identifying a customer account that funds the requested payment, and information identifying merchant 111. Further, the payment notification may also include digital content that, when presented on a digital interface generated by an application program executed at client device 102 (e.g., mobile banking application 108 of FIG. 1, etc.), prompt user 101 to provide input to client device 102 that approves, or alternatively, rejects, the real-time payment requested from user 101 by merchant 111.

FI computing system 130 may perform any of the exemplary processes described herein to package the generated payment notification and the generated product notification (including the selected product data and the nominal payment notification) into corresponding portions of notification data, and to transmit the notification data across communications network 120 to client device 102 (e.g., in step 522 of FIG. 4A). In some instances, client device 102 may receive the elements of notification data, and an application program executed by the one or more processors of client device 102 (e.g., executed mobile banking application 108) may perform any of the exemplary processes described herein to present, within a corresponding digital interface, a graphical representation of the product notification that prompts user 101 to accept, or alternatively, decline, the offer to fund the requested, real-time payment using the selected financial product, based on a provision of input to client device 102 (e.g., via input unit 109B of client device 102) that approves the real-time payment of the nominal amount.

In other instances, in response to additional input provisioned to client device 102 (e.g., via input unit 109B of client device 102) that rejects the real-time payment of the nominal amount requested by the financial institution, and as such, that declines the offer to fund the real-time payment requested by merchant 111 using the selected financial product, the application program executed by the one or more processors of client device 102 (e.g., executed mobile banking application 108) may perform any of the exemplary processes described herein to present, within the corresponding digital interface, a graphical representation of the payment notification that prompts user 101 to approve, or reject, the funding of the real-time payment requested by merchant 111 using the funding account (e.g., the payment instrument selected by user 101). Exemplary process 500 may be complete in step 524.

Referring to FIG. 5B, client device 102 may perform any of the exemplary processes described herein to receive the elements of notification data from FI computing system 130, and store the elements of notification data within a portion of a tangible, non-transitory memory accessible to client device 102 (e.g., in step 532 of FIG. 5B). Client device 102 may also perform any of the exemplary processes described herein to obtain the product notification (e.g., including the selected product data and the nominal payment notification) from the received elements of notification data, and generate, and render for presentation within a corresponding digital interface, a graphical representation of portions of the product notification that prompts user 101 to accept, or alternatively, decline, the offer to fund the requested, real-time payment using the selected financial product based on a provision of additional input to client device that approves the nominal, real-time payment requested by the financial institution (e.g., in step 534 of FIG. 5B). Further, client device 102 may also receive, via input unit 109B, elements of user input that accepts, or alternatively, declines, the offer to fund the real-time payment requested by merchant 111 using the selected financial product (e.g., in step 536 of FIG. 5B).

As described herein, the user input received via input unit 109B by may indicate an approval, or alternatively, a rejection, by user 101 of the nominal real-time payment requested by the financial institution, and based on the elements of user input, client device 102 may determine whether user 101 approved, or rejected, the nominal real-time payment requested by the financial institution and as such, whether user 101 accepted, or declined, the offer to fund the real-time payment requested by merchant 111 using the selected financial product (e.g., in step 538 of FIG. 5B). If, for example, client device 102 were to determine that user 101 approved the nominal real-time payment requested by the financial institution and as such, that user 101 accepted the offer to fund the real-time payment requested by merchant 111 using the selected financial product (e.g., step 538; YES), client device 102 may perform any of the exemplary processes described herein to process the elements of input data and generate a product confirmation indicative of the approval, by user 101, of the nominal real-time payment requested by the financial institution and the acceptance, by user 101, of the offer to fund the real-time payment requested by merchant 111 using the selected financial product (e.g., in step 540 of FIG. 5B). Client device 102 may also perform operations that transmit a response to the notification data that includes the product confirmation to FI computing system 130 (e.g., also in step 540 of FIG. 5B). Exemplary process 530 may be complete in step 542.

Alternatively, if client device 102 were to determine that user 101 rejected the nominal real-time payment requested by the financial institution and as such, that user 101 declined the offer to fund the real-time payment requested by merchant 111 using the selected financial product (e.g., step 538; NO), client device 102 may perform any of the exemplary processes described herein to generate an additional product confirmation indicating the rejection of both the nominal real-time payment requested by the financial institution and the offer to fund the real-time payment requested by merchant 111 using the selected financial product (e.g., in step 543 of FIG. 5B). Client device 102 may also perform any of the exemplary processes described herein to obtain the payment notification from the received elements of notification data, and generate, and render for presentation within a corresponding digital interface, a graphical representation of the payment notification that prompts user 101 to approve, or alternatively, reject, the real-time payment requested from user 101 by merchant 111 (e.g., in step 544 of FIG. 5B). Client device 102 may receive, via input unit 109B, elements of user input indicative of an approval, or alternatively, a rejection, of the requested, real-time payment by user 101 (e.g., in step 546 of FIG. 5B), and based on the elements of user input, client device 102 may determine whether user 101 approved, or rejected, the requested real-time payment (e.g., in step 548 of FIG. 5B).

If, for example, client device 102 were to determine that user 101 approved the requested, real-time payment (e.g., step 548; YES), client device 102 may perform any of the exemplary processes described herein to process the elements of input data and generate a payment confirmation indicative of the approval, by user 101, of the requested real-time payment, and to transmit a response to the notification data that includes the additional product confirmation and the payment confirmation to FI computing system 130 (e.g., in step 550 of FIG. 5B). Exemplary process 530 may then be complete in step 542. Alternatively, if client device 102 were to determine that user 101 rejected the requested, real-time payment (e.g., step 548; NO), client device 102 may perform any of the exemplary processes described herein to generate an additional payment confirmation indicating the rejection of the requested, real-time payment by user 101 and to generate elements of additional response data that include the additional product and payment confirmations in conjunction with the identifier of user 101 and/or merchant 111 (e.g., in step 552 of FIG. 5B). Client device 102 may also transmit the elements of additional response data across communications network 120 to FI computing system 130 (e.g., also in step 552 of FIG. 5B). Exemplary process 530 is then complete in step 542.

Referring to FIG. 5C, FI computing system 130 may receive the elements of response data from client device 102, and may store the received elements of response data within one or more tangible, non-transitory memories accessible to FI computing system 130, such as in conjunction with the elements of decomposed field data within data repository 134 (e.g., in step 562 of FIG. 5C). FI computing system 130 may also perform any of the exemplary processes described herein to obtain, from the elements of response data, the product confirmation indicative of the acceptance, or alternatively, the rejection, of the nominal real-time payment requested by the financial institution and as such, the acceptance, or alternatively, the rejection, of the offer to fund the real-time payment requested by merchant 111 using the selected financial product (e.g., in step 564 of FIG. 5C), and to process the product confirmation and determine whether user 101 accepted, or declined, the offer (e.g., in step 566 of FIG. 4C).

If, for example, FI computing system 130 were to determine that user 101 accepted the offer to fund the real-time payment requested by merchant 111 using the selected financial product based on the approval of the nominal, real-time payment requested by the financial institution (e.g., step 566; YES), FI computing system 130 may perform any of the exemplary processes described herein to complete a qualification or underwriting process and provision the selected financial product to the customer (e.g., in step 568 of FIG. 5C). FI computing system 130 may perform any of the exemplary processes described herein, in step 568, to execute the real-time payment requested by merchant 111 using funds drawn from the now-issued financial product, and to delete the RFP message from the message queue. FI computing system 130 may perform any of the exemplary processes described herein, in step 568, to execute the nominal, real-time payment requested by the financial institution (e.g., the nominal, $1.00 payment, etc.). Exemplary process 560 may then be complete in step 570.

Alternatively, if FI computing system 130 were to determine that user 101 declined the offer to fund the requested by merchant 111 using the selected financial product based on the rejection of the nominal, real-time payment requested by the financial institution (e.g., step 566; NO), FI computing system 130 may perform any of the exemplary processes described herein to obtain, from the elements of response data, the payment confirmation indicative of the approval, or alternatively, the rejection, of the real-time payment request from user 101 by merchant 111 (e.g., in step 572 of FIG. 5C), and to process the payment confirmation and to determine whether user 101 approved, or rejected, the real-time payment (e.g., in step 574 of FIG. 5C).

If, for example, FI computing system 130 were to determine that user 101 approved the real-time payment requested by merchant 111 (e.g., step 574; YES), FI computing system 130 may perform any of the exemplary processes described herein to execute the now-approved real-time payment based on the payment confirmation and in accordance with the elements of decomposed field data, the debit the requested payment amount from the funding account selected by user 101, and that delete the RFP message from the RFP message queue (e.g., in step 576 of FIG. 5C). Exemplary process 560 may then be complete in step 570.

Alternatively, if FI computing system 130 were to determine that user 101 rejected the real-time payment requested by merchant 111 (e.g., step 574; NO), FI computing system 130 may perform any of the exemplary processes described herein to broadcast one or more additional ISO-20022-compliant RTP messages that confirm the rejection of the requested, real-time payment by user 101, and that delete the RFP message from the RFP message queue (e.g., in step 578 of FIG. 4C). Exemplary process 560 may be complete in step 570.

III. Exemplary Hardware and Software Implementations

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, such as, but not limited to, mobile banking application 108, decomposition engine 146, conversion engine 148, notification engine 150, application program 202, application programming interfaces (APIs) 208, 302, 420, 435, and 450, point-of-sale (POS) application 210, real-time payment (RTP) engine 232, remittance analysis engine 316, extraction module 422, interface element generation module 424, response module 432, provisioning engine 436, and RTP engine 446, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, an application program, an engine, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, such as user 101, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

What is claimed is:

1. An apparatus comprising:

a communications interface;

a memory storing instructions; and at least one processor coupled to the communications interface and to the memory, the at least one processor being configured to execute the instructions to:

receive, across a first communications channel via the communications interface, a first message associated with an exchange of data initiated between a first device operable by a first counterparty and a second device associated with a second counterparty, the first device being disposed at a location proximate to the second device, the first message comprising elements of message data disposed within corresponding first message fields that are structured in accordance with a standardized data-exchange protocol, and the elements of message data characterizing the initiated data exchange;

obtain, from the memory, mapping data associated with the standardized data-exchange protocol, the mapping data identifying the first message fields and corresponding ones of the elements of message data;

perform operations, in real-time upon receipt of the first message, that extract the elements of message data from corresponding ones of the first message fields of the first message based on the mapping data, the elements of message data comprising a first parameter value that characterizes the initiated data exchange;

based on at least the first parameter value, determine that a product is available to the first counterparty, and generate product data characterizing the available product;

transmit, in real-time upon receipt of the first message and across a second communications channel via the communications interface, first notification data to the first device operable by the first counterparty, the first notification data comprising digital content associated with the available product and with the data exchange, and the first device being configured to present at least a portion of the digital content within a first digital interface and being disposed proximate to the second device during the presentation of the portion of the digital content;

based on response data generated by the first device, perform operations that provision the available product to the first counterparty in accordance with the product data;

perform operations that execute the initiated data exchange based on the provisioning of the product to the first counterparty and while the first device is disposed proximate to the second device; and transmit, across the first communications channel via the communications interface, a second message associated with the executed data exchange to a computing system associated with the second counterparty, the second message comprising second message fields that include one or more elements of the product data, the second message causing the computing system to transmit, to the second device, confirmation data characterizing the execution of the initiated data exchange, the second device being configured to present at least a portion of the confirmation data within a second digital interface and being disposed proximate to the first device during the presentation of the portion of the confirmation data, and the second device comprising a terminal device associated with the computing system.

2. The apparatus of claim 1, wherein:

the product data comprises a product identifier and a second parameter value, and the first notification data is associated with an offer to provision the product to the first counterparty in accordance with the second parameter value; and the at least one processor is further configured to execute the instructions to:

receive the response data across the second communications channel from the first device via the communications interface;

establish that the response data is associated with an acceptance of the offer to provision the product to the first counterparty in accordance with the second parameter value; and perform operations that provision the available product to the first counterparty in accordance with the second parameter value.

3. The apparatus of claim 2, wherein:

the first message fields of the first message further characterize a first real-time payment requested from the first counterparty by the second counterparty, the first real-time payment being associated with the initiated data exchange;

the first notification data comprises additional digital content associated with a second real-time payment;

the first device is further configured to present at least a portion of the additional digital content within the first digital interface; and the at least one processor is further configured to execute the instructions to:

determine that the response data is associated with an approval of the second real-time payment; and establish that the response data is associated with the acceptance of the offer based on the determination that the response data is associated with the approval of the second real-time payment.

4. The apparatus of claim 2, wherein the at least one processor is further configured to execute the instructions to:

determine that the response data is associated with a rejection of the offer; and transmit, across the second communications channel to the first device via the communications interface, second notification data that includes information characterizing the first real-time payment, the second notification data causing the first device to present at least a portion of the information within the first digital interface.

5. The apparatus of claim 1, wherein:

the product data comprises a product identifier and a second parameter value; and the at least one processor is further configured to execute the instructions to: obtain a qualification criterion associated with the product from the memory; and determine the second parameter value based on the qualification criterion and on one or more of the elements of message data.

6. The apparatus of claim 1, wherein the at least one processor is further configured to execute the instructions to store the elements of message data within the memory, the elements of message data comprising a first identifier of the first counterparty, a second identifier of the second counterparty, and the first parameter value characterizing the data exchange.

7. The apparatus of claim 1, wherein the at least one processor is further configured to execute the instructions to:

obtain, based on the mapping data, remittance information associated with the data exchange from one or more of the first message fields, the remittance information comprising a uniform resource locator associated with elements of formatted data maintained by the computing system associated with the second counterparty;

based on the uniform resource locator, perform operations that request and receive the elements of formatted data across the first communications channel from the computing system via the communications interface;

process the elements of formatted data using at least one of a trained machine learning process or a trained artificial intelligence process; and obtain at least one of the first identifier, the second identifier, or the first parameter value characterizing the data exchange from the processed elements of formatted data.

8. A computer-implemented method, comprising:

receiving, across a first communications channel using at least one processor, a first message associated with an exchange of data initiated between a first device operable by a first counterparty and a second device associated with a second party counterparty, the first device being disposed at a location proximate to the second device, the message comprising elements of message data disposed within corresponding first message fields that are structured in accordance with a standardized data-exchange protocol, and the elements of message data characterizing the initiated data;

obtaining, from a data repository using the at least one processor, mapping data associated with the standardized data-exchange protocol, the mapping data identifying the first message fields and corresponding ones of the elements of message data;

performing operations, using the at least one processor, and in real-time upon receipt of the first message, that extract the elements of message data from corresponding ones of the first message fields of the first message based on the mapping data, the elements of message data comprising a first parameter value that characterizes the initiated data exchange;

based on at least the first parameter value, determining that a product is available to the first counterparty using the at least one processor, and generating, using the at least one processor, product data characterizing the available product;

transmitting, in real-time upon receipt of the first message and across a second communications channel using the at least one processor, first notification data to the first device operable by the first counterparty, the first notification data comprising digital content associated with the available product and with the data exchange, and the first device being configured to present at least a portion of the digital content within a first digital interface and being disposed proximate to the second device during the presentation of the portion of the digital content;

based on response data generated by the first device, performing operations, using the at least one processor, that provision the available product to the first counterparty in accordance with the product data;

performing operations, using the at least one processor, that execute the initiated data exchange based on the provisioning of the product to the first counterparty and while the first device is disposed proximate to the second device; and transmitting, across the first communications channel, using the at least one processor, a second message associated with the executed data exchange to a computing system associated with the second counterparty, the second message comprising second message fields that include one or more elements of the product data, the second message causing the computing system to transmit, to the second device, confirmation data characterizing the execution of the initiated data exchange, the second device being configured to present at least a portion of the confirmation data within a second digital interface and being disposed proximate to the first device during the presentation of the portion of the confirmation data, and the second device comprising a terminal device associated with the computing system.

9. The computer-implemented method of claim 8, wherein:

the product data comprises a product identifier and a second parameter value, and the first notification data is associated with an offer to provision the product to the first counterparty in accordance with the second parameter value; and the computer-implemented method further comprises:

receiving the response data across the second communications channel from the first device using the at least one processor;

establishing, using the at least one processor, that the response data is associated with an acceptance of the offer to provision the product to the first counterparty in accordance with the second parameter value; and performing operations, using the at least one processor, that provision the available product to the first counterparty in accordance with the second parameter value.

10. The computer-implemented method of claim 9, wherein:

the first message fields of the first message further characterize a first real-time payment requested from the first counterparty by the second counterparty, the first real-time payment being associated with the initiated data exchange;

the first notification data comprises additional digital content associated with a second real-time payment;

the first device is further configured to present at least a portion of the additional digital content within the first digital interface; the computer-implemented method further comprises determining, using the at least one processor, that the response data is associated with an approval of the second real-time payment; and the establishing comprises establishing that the response data is associated with the acceptance of the offer based on the determination that the response data is associated with the approval of the second real-time payment.

11. The computer-implemented method of claim 10, further comprising:

determining, using the at least one processor, that the response data is associated with a rejection of the offer; and transmitting, using the at least one processor, and to the first device across the second communications channel, second notification data that includes information characterizing the first real-time payment, the second notification data causing the first device to present at least a portion of the information within the first digital interface.

12. The computer-implemented method of claim 10, further comprising:

obtaining, using the at least one processor, and based on the mapping data, remittance information associated with the data exchange from one or more of the first message fields, the remittance information comprising a uniform resource locator associated with elements of formatted data maintained by the computing system associated with the second counterparty;

based on the uniform resource locator, perform operations that request and receive the elements of formatted data across the first communications channel from the computing system;

using the at least one processor, process the elements of formatted data using at least one of a trained machine learning process or a trained artificial intelligence process; and obtaining, using the at least one processor, at least one of the first identifier, the second identifier, or the first parameter value characterizing the data exchange from the processed elements of formatted data.

13. A tangible, non-transitory computer-readable medium storing instructions that, when executed by at least one processor, cause the at least one processor to perform a method, comprising:

receiving, across a first communications channel, a first message associated with an exchange of data initiated between a first device operable by a first counterparty and a second device associated with a second party counterparty, the first device being disposed at a location proximate to the second device, the message comprising elements of message data disposed within corresponding first message fields that are structured in accordance with a standardized data-exchange protocol, and the elements of message data characterizing the initiated data;

obtaining, from a data repository, mapping data associated with the standardized data-exchange protocol, the mapping data identifying the first message fields and corresponding ones of the elements of message data;

performing operations, in real-time upon receipt of the first message, that extract the elements of message data from corresponding ones of the first message fields of the first message based on the mapping data, the elements of message data comprising a first parameter value that characterizes the initiated data exchange;

based on at least the first parameter value, determining that a product is available to the first counterparty, and generating product data characterizing a product available to the first counterparty;

transmitting, in real-time upon receipt of the first message, first notification data to a first device operable by the first counterparty across a second communications channel, the first notification data comprising digital content associated with the available product and with the data exchange, and the first device being configured to present at least a portion of the digital content within a first digital interface and being disposed proximate to the second device during the presentation of the portion of the digital content;

based on response data generated by the first device, performing operations that provision the available product to the first counterparty in accordance with the product data;

performing operations that execute the initiated data exchange based on the provisioning of the product to the first counterparty and while the first device is disposed proximate to the second device; and transmitting, across the first communications channel, a second message associated with the executed data exchange to a computing system associated with the second counterparty, the second message comprising second message fields that include one or more elements of the product data, the second message causing the computing system to transmit, to the second device, confirmation data characterizing the execution of the initiated data exchange, the second device being configured to present at least a portion of the confirmation data within a second digital interface and being disposed proximate to the first device during the presentation of the portion of the confirmation data, and the second device comprising a terminal device associated with the computing system.

14. The apparatus of claim 1, wherein:

the first notification data causes a first application program executed by the first device to present at least the portion of the digital content within the first digital interface in real-time and prior to the execution of the data exchange; and the second device executes a second application program, the executed second application causing the second device to present at least the portion of the confirmation data within the second digital interface, the portion of the confirmation data being presented subsequent to the execution of the initiated data exchange.

15. The apparatus of claim 1, wherein:

the mapping data is associated with the standardized data exchange protocol; and the at least one processor is further configured to execute the instructions to:

based on the mapping data, obtain at least a subset of the elements of message data from corresponding ones of the first message fields; and based on the product data, generate the second message based in accordance with the mapping data, the second message comprising elements of the product data within corresponding ones of the second message fields.

16. The apparatus of claim 1, wherein:

the product data comprises a product identifier and a value of a second parameter characterizing the product;

the at least one processor is further configured to execute the instructions to generate the first notification data based on the elements of message data and the product data, the first notification data comprising the first parameter value, the product identifier, the second parameter value, and the digital content; and the first notification data causes an application program executed by the first device to present at least the portion of the digital content, the first parameter value, the product identifier, and the second parameter value within the first digital interface.

17. The apparatus of claim 1, wherein the at least one processor is further configured to execute the instructions to:

establish the first communications channel between the apparatus and the computing system associated with the second counterparty; and establish the second communications channel between the apparatus and an application program executed by the first device.

18. The apparatus of claim 1, wherein:

the data exchange is initiated between the first device and the terminal device;

the at least one processor is further configured to execute the instructions to perform the operations that (i) provision the available product to the first counterparty in accordance with the product data and (ii) execute the initiated data exchange based on the provisioning of the product to the first counterparty within a temporal interval subsequent to the initiation of the data exchange, the first device being disposed at a location proximate to the second device during the temporal interval; and the second message causes the computing system to transmit the confirmation data to the second device across a third communications channel, the third communications channel being established between the computing system and an application program executed by the second device.

19. The apparatus of claim 1, wherein the at least one processor is further configured to execute the instructions to transmit the first notification data to the first device across the second communications channel via the communications device, and to transmit the second message to the computing system across the first communications channel via the communications interface, within a predetermined time period of a receipt of the first message.

20. The apparatus of claim 1, wherein the at least one processor is further configured to execute the instructions to perform the operations that provision the available product to the first counterparty in accordance with the product data and to perform the operations that execute the initiated data exchange in real-time upon receipt of the first message and while the first device is disposed proximate to the second device.

* * * * *